US009521528B1

(12) United States Patent
Gupta et al.

(10) Patent No.: US 9,521,528 B1
(45) Date of Patent: Dec. 13, 2016

(54) NON-DUPLICATION OF MESSAGE DELIVERY IN A SHORT MESSAGE SERVICE

(71) Applicant: Amazon Technologies, Inc., Seattle, WA (US)

(72) Inventors: Sanjeev Gupta, San Jose, CA (US); Latha Srinivasan, Santa Clara, CA (US); Nupur Rastogi, Cupertino, CA (US); Kiran Kumar Edara, Cupertino, CA (US)

(73) Assignee: Amazon Technologies, Inc, Seattle, WA (US)

( * ) Notice: Subject to any disclaimer, the term of this patent is extended or adjusted under 35 U.S.C. 154(b) by 0 days.

(21) Appl. No.: 14/577,246

(22) Filed: Dec. 19, 2014

(51) Int. Cl.
*H04W 4/00* (2009.01)
*H04W 4/14* (2009.01)
*H04L 1/16* (2006.01)

(52) U.S. Cl.
CPC .............. *H04W 4/14* (2013.01); *H04L 1/1657* (2013.01)

(58) Field of Classification Search
CPC ................................ H04W 4/14; H04L 1/1657
USPC ....................................................... 455/466
See application file for complete search history.

(56) References Cited

U.S. PATENT DOCUMENTS 6,201,966 B1 3/2001 Rinne et al.
9,094,858 B2 * 7/2015 Burbidge ............ H04W 76/028
9,210,679 B2 * 12/2015 Kim ...................... H04W 60/06
2005/0181759 A1 8/2005 Hundscheidt et al.
2011/0103277 A1 5/2011 Watfa et al.
2013/0115982 A1 5/2013 Stojanovski et al.
2014/0016614 A1 1/2014 Velev et al.
2014/0226562 A1 8/2014 Shah et al.

OTHER PUBLICATIONS

Digital cellular telecommunications system (Phase 2+); Universal Mobile Telecommunications Systems (UMTS); LTE: Point-to-Point (PP) Short Message Service (SMS) support on mobile radio interface (3Gpp TS 24.011 version 12.0.0 Release 12, Oct. 2014), pp. 29, 26, 27, 44, 64.

* cited by examiner

*Primary Examiner* — Amancio Gonzalez
(74) *Attorney, Agent, or Firm* — Sutherland Asbill & Brennan LLP

(57) ABSTRACT

Sending short message service (SMS) messages and receiving a response report based at least in part on the sent SMS message, even if a communicative connection with the mobile communications network had been severed, so that duplication of the SMS message is avoided is disclosed. In this case, a communicative connection may be re-established and used to receive an acknowledgment from the mobile communications network and subsequently send another acknowledgement to the mobile communications network. The UE may also be configured to send an information element to the one or more elements of the mobile communications network to indicate that a communicative connection with the network is to remain established so that acknowledgements may be reconciled between the UE and the network. Additionally, the mobile communications network may be configured to transmit the SMS message only after receiving the acknowledgement from the UE, to avoid sending duplicate SMS messages.

18 Claims, 10 Drawing Sheets

NON-DUPLICATION OF MESSAGE DELIVERY IN A SHORT MESSAGE SERVICE

BACKGROUND

Short message service (SMS) messages or text messages are often sent and received by mobile communications devices. These SMS messages are a convenient mechanism for users to communicate with each other via messages that are of a limited size. These SMS messages may be carried via mobile communications infrastructure, such as long term evolution (LTE) and/or fourth generation (4G) mobile communications networks. The SMS message may be generated by an originating user equipment that transmits the SMS message to the mobile communication infrastructure, from where the SMS message may be transmitted to a recipient user equipment.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
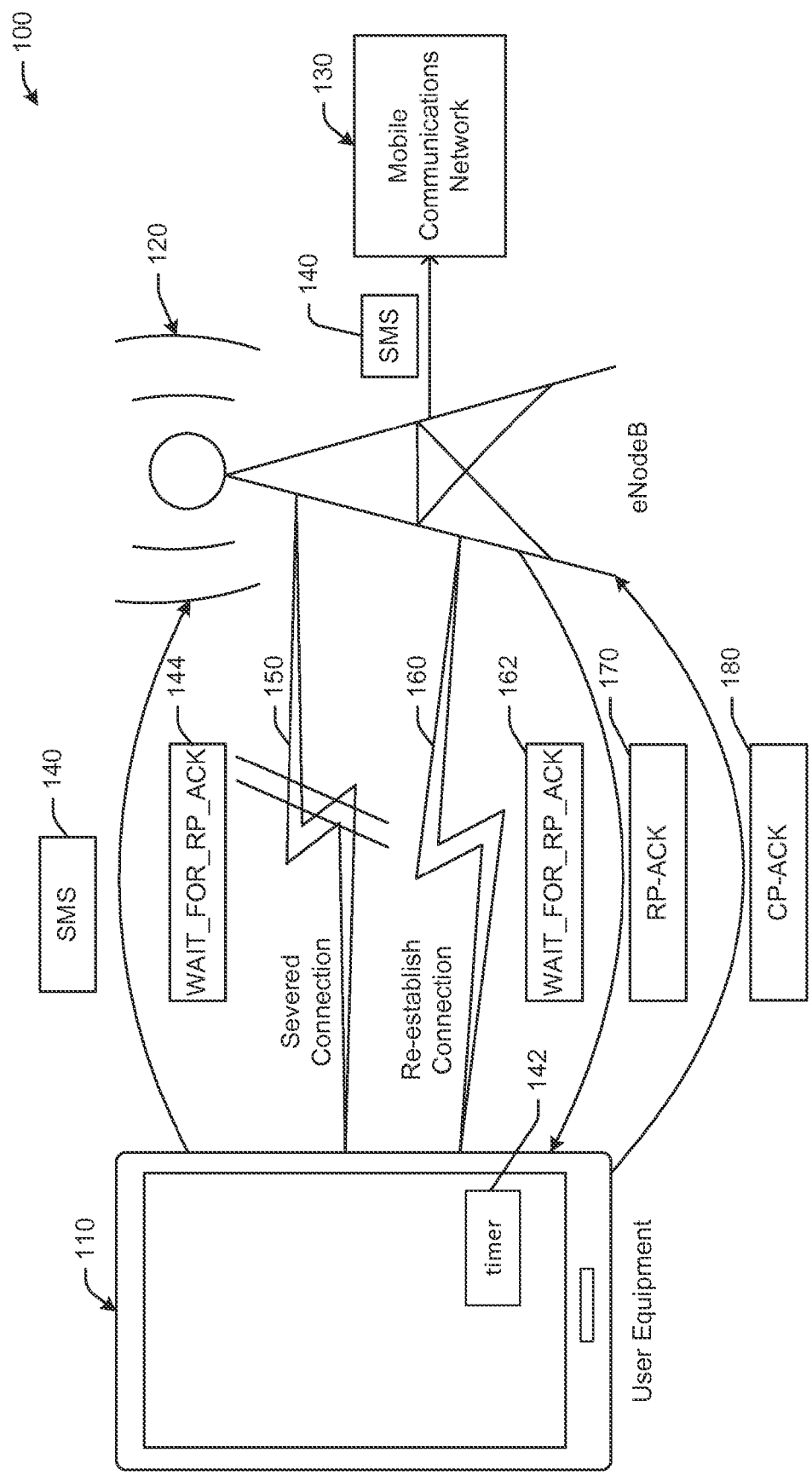
FIG. 1 is a schematic diagram that illustrates an example environment where a short message service (SMS) message is sent by a user equipment and the user equipment receives an acknowledgement of the SMS and provides a response to the acknowledgement, in accordance with example embodiments of the disclosure.

Example embodiments of the present disclosure may allow for preventing duplicate transmissions of short message service (SMS) message. A user equipment (UE) may be configured to send an SMS message, such as an SMS message that may have a destination of another user equipment. When an SMS message is sent from a sending UE to a receiving UE via a mobile communications network, preventing duplication of SMS messages may enhance user experience. The UE may be configured to transmit the SMS message to a mobile communications network, such as a long term evolution (LTE) and/or a fourth generation (4G) mobile communications network for subsequent transmission to the destination UE. In example embodiments, the user equipment may adhere, or at least partially adhere to Third Generation Partnership Project (3GPP) Technical Specification (TS) 24.011 for Point-to-Point SMS. In example embodiments, the mechanisms for providing a response message and/or report after receiving an SMS message, as described herein, may be in accordance with 3GPP TS 24.011. Alternatively, in example embodiments, the mechanisms for providing a response message and/or report after receiving an SMS message, as described herein, may be an enhancement to 3GPP TS 24.011 specifications.

According to certain example embodiments, UE may transmit a SMS message to the mobile communications network via an Evolved Node B (eNodeB) or base station. At the mobile communication network, the SMS message may be received and transmitted to a recipient user equipment. Upon receiving the SMS message, the mobile communications network may generate and transmit a confirmation (RP-ACK) of receiving the SMS message to the mobile originating user equipment, or the UE from which the SMS message originated. Upon receiving the RP-ACK, the UE may proceed to generate and transmit to the mobile communications network a confirmation (CP-ACK) of receiving the RP-ACK. The CP-ACK may notify the mobile communications network that the mobile originating UE has received the RP-ACK and, therefore, no additional copies of the sent SMS message may be expected. In other words, the mobile originating UE will not try to retransmit the same SMS message, because it received confirmation (e.g., via the received RP-ACK) that the message has reached the mobile communications network for subsequent transmission to a mobile terminating UE. If a CP-ACK is not received by the mobile communications network within a predefined period of time, then it may be ascertained that a duplicate one of the SMS message may be sent by the mobile originating UE.

In example embodiments, a communications link between the mobile originating UE and the eNodeB and the mobile communications network may be severed or disconnected for any variety of reasons prior to the UE receiving confirmation (RP-ACK) from the mobile communications network. In these example embodiments, the UE may be in a state for waiting for the RP-ACK (WAIT_FOR_RP-ACK state) upon sending the SMS message to the mobile communications network. At that point, the UE may start a timer (TRIM), within which a CP-ACK is to be sent responsive to a received RP-ACK. At the point where the communications link between the UE and the mobile communications network has been severed, according to example embodiments, the UE may remain in the WAIT_FOR_RP-ACK state with the TRIM timer running, while the UE attempts to reestablish a connection with the mobile communications network. Upon reestablishing a communicative connection with the mobile communications network, the UE may receive the RP-ACK from the mobile communication network and, responsive to the RP-ACK, transmit the CP-ACK.

This concept can be understood with reference to FIG. 1. FIG. 1 is a schematic diagram that illustrates an example environment 100 where a short message service (SMS) message 140 is sent by a user equipment 110 and the user equipment receives an acknowledgement (RP-ACK) 170 of the SMS message 140 and provides a response (CP-ACK) 180 to the acknowledgement, in accordance with example embodiments of the disclosure.

This communications connection between the UE 110 and an eNodeB 120 may be a Radio Resource Control (RRC) protocol connection at an access stratum (e.g., Open Systems Interconnect (OSI) model layer 2 or 3). The RRC connection may support a higher layer connection, such as a non-access stratum (NAS) connection between the UE 110 and the mobile communications network 130. The SMS message 140 may be transmitted by the UE 110 as a NAS protocol data unit (PDU) encapsulated mobile originated data (RP-DATA). The UE 110 may have, may be executed by one or more processor(s) that may execute an application software, such as an application for receiving, sending, and/or rendering SMS messages of the UE 110 to encapsulate the SMS message 140 as the transmitted RP-DATA. In some example embodiments, once the NAS PDU encapsulated SMS message 140 is transmitted, the UE 110 may start a timer (TRIM) 142 to measure the time elapsed after transmitting the SMS message 140. Additionally, the UE 110 may enter into a WAIT_FOR_RP-ACK state 144, where the UE 110 is expecting a RP-ACK responsive to the RP-DATA SMS message 140 that it transmitted to the mobile communications network 130 via the eNodeB 120.

The mobile communications network 130 may transmit the RP-DATA with the encapsulated SMS message 140 and the SMS message 140 may be identified, such as by parsing the one or more RP-DATA data packets receive by the mobile communications network 130 to identify the SMS message 140 payload therein. After identifying the SMS message 140, the mobile communications network 130 may identify if there are any errors detected in the SMS message 140. In other words, the mobile communications network 130 may assess if the SMS message has been received without error. These errors may be identified by analyzing the SMS message 140, or otherwise checking for a predefined set of potential errors associated with transmitting the SMS message 140 from a mobile originating UE 110 to the mobile communications network 130. In example embodiments, the error checking of the SMS message 140 may be performed and/or enabled by one or more instructions executed by one or more servers with one or more processor(s) at the mobile communications network 130. If it is determined that the SMS message 140 was received without any errors, then the mobile communications network 130 may generate and transmit an acknowledgment message (RP-ACK) that may be NAS PDU encapsulated and UE 110 may be configured to generate an acknowledgement of error free receipt of the SMS message 140 as a NAS PDU encapsulated report (RP-ACK). If, on the other hand, it is determined that the SMS message was received with one or more error(s), then the UE 110 may generate an indication of receipt with error as a NAS PDU encapsulated report (RP-ERR).

While the UE 110 is in the WAIT_FOR_RP-ACK state 144, in example embodiments, the communicative connection between the UE 110 and the eNodeB 120 may be severed 150 for any variety of reasons. In this case, the UE 110 may detect that the communications connection(s) (e.g., RRC connection to eNodeB 120 and NAS signaling connection to the mobile communications network 130) may be severed 150 or disconnected. Due to the severed communications links 150, the UE 110 may not be able to receive the RP-ACK or the RP-ERR from the mobile communications network 130. Additionally, if the communications link remains severed 150, then the UE 110 would not be able to transmit the CP-ACK responsive to the received RP-ACK. In example embodiments, the UE 110 may detect that the communication links are severed 150 only upon attempting to transmit, such as a message, via the communications links. In other example embodiments, the UE 110 may receive notification when the eNodeB 120 and/or the mobile communications network 130 terminates the communications link 150. The communications link may be relatively more prone to being severed by the eNodeB 120 and/or the mobile communications network 130 if the UE 110 is not actively engaged in voice, data, or SMS message transactions with the mobile communications network 130. In other cases, the RRC and NAS link may be severed from the UE 110 end, such as due to loss of RF signal between the UE 110 and the eNodeB 120.

At this point, in example embodiments, after determining that the communications links (e.g., RRC connection and NAS signaling link) have been severed 150, the UE 110 may reestablish the communications links 160. In example embodiments, the UE 110 may be configured to reestablish the links 160 based at least in part on identifying that it has not yet received an RP-ACK/RP-ERR report from the mobile communications network 130 and that the previously existing communications links are now severed 150. Therefore, in example embodiments, the UE 110 may reestablish the communications links 160 to enable receiving the response report of RP-ACK or RP-ERR. The UE 110 may perform a service request procedure and interact with the eNodeB 120 and the mobile communications network to reestablish the RRC communications link and the NAS signaling communications link 160. After reestablishing the communications links 160, the UE 110 may be configured to receive the RP-ACK or RP-ERR 170 from the mobile communications network 130. In example embodiments, the UE 110 may remain in a WAIT_FOR_RP-ACK state 162 even after the communications connection had been severed 150. In example embodiments, the timer 142 of the UE 110 may continue to track the time after the SMS message 140 was transmitted by the UE 110 even after the communications connection had been severed 150. In further example embodiments, the UE 110 may remain in a WAIT_FOR_RP-ACK state 162 and continue to track the time since transmitting the SMS message 140 with the timer 142 even after the communications connection had been reestablished 160.

In example embodiments, the UE 110 may receive the RP-ACK 170 or the RP-ERR from the mobile communications network 130 after the communications links have been reestablished 160. If an RP-ACK is received, the UE 110 may respond by sending a CP-ACK 180 to the mobile communications network 130. Therefore, the UE 110 is configured to maintain its state 144 even when the communication connection is severed 150 and reestablished for the purpose of exchanging and/or reconciling the RP-ACK and CP-ACK and therefore, does not send a duplicate SMS message in the case where the SMS message is successfully transferred to the mobile communications network 130.

In additional example embodiments, the UE 110 may provide a supplementary information element (e.g., a message to maintain a communicative connection) to the eNodeB 120 and/or the mobile communications network 130 to maintain the communicative connection with the UE 110. In example embodiments, the message to maintain the communicative connection may be provided with an additional message (e.g., in addition to the encapsulated SMS message (RP-DATA) or as an information element of RP-DATA. In some cases, the information element may be transmitted at the RRC layer to the eNodeB 120 directing the eNodeB 120 to maintain the communicative connection, while the RP-DATA is transmitted via the NAS signaling connection maintained via the RRC layer.

Figure 2:
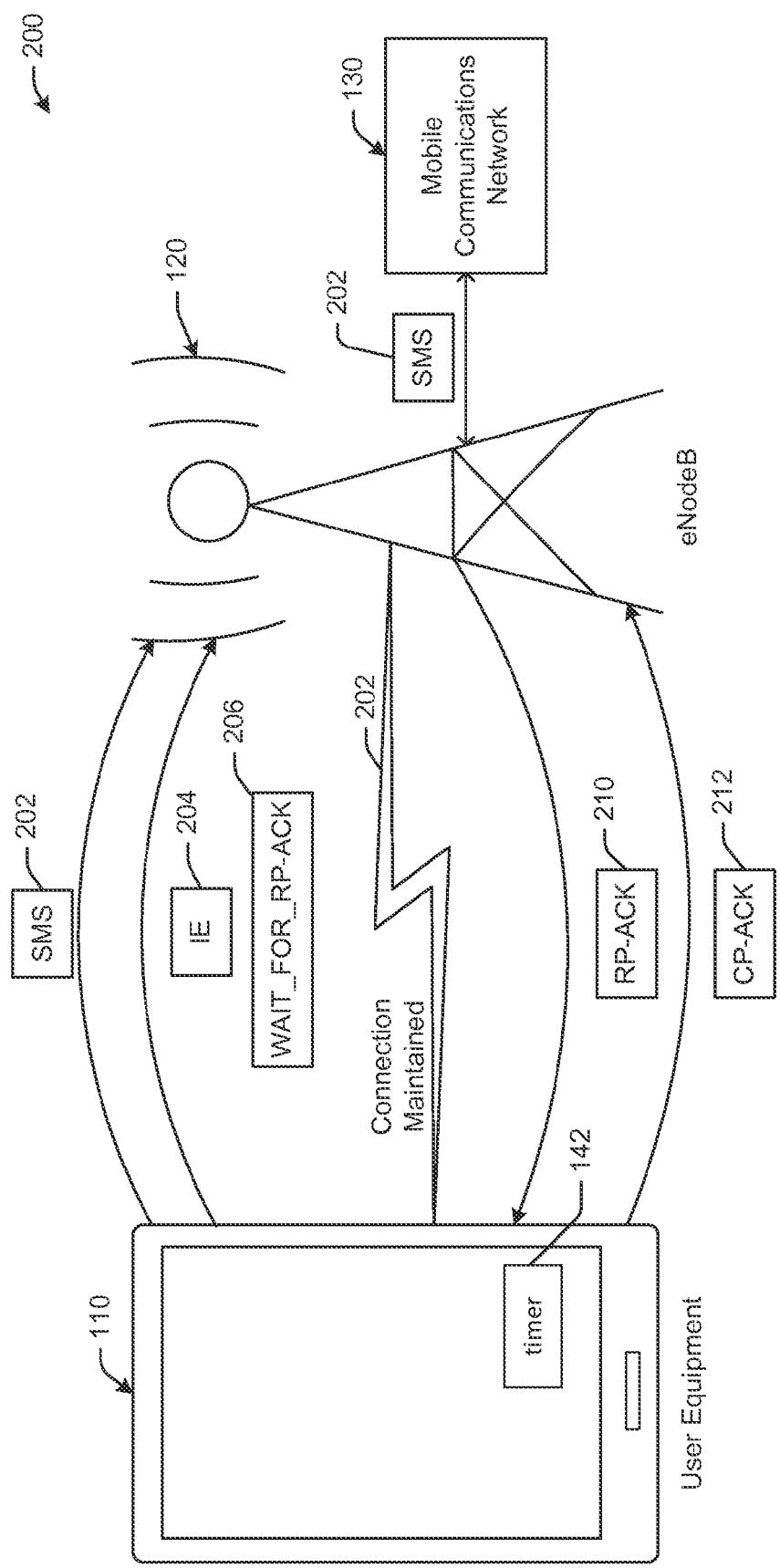
FIG. 2 is a schematic diagram that illustrates another example environment where a SMS message is sent by the user equipment along with information element(s) that indicate that a communicative connection is to remain established for additional communication, in accordance with example embodiments of the disclosure.

This concept of transferring an information element for the purpose of indicating that the communicative connection is to be maintained may be understood with reference to FIG. 2. FIG. 2 is a schematic diagram that illustrates another example environment 200 where a SMS message 140 is sent by the user equipment 110 along with information element(s) (IE) 204 that indicate that a communicative connection 208 is to remain established for additional communication, in accordance with example embodiments of the disclosure. As shown, when the SMS message 202 is sent by the UE 110 to the mobile communications network 130 via the eNodeB 120, one or more IE(s) 204 may be transmitted as well to the eNodeB 120. The information elements may indicate that the eNodeB 120 is to maintain the RRC connection and the NAS signaling connection maintained thereon for a predetermined period of time, such that acknowledgement transactions may be performed between the UE 110 and the mobile communications network 130. The IE 204 may be incorporated, in example embodiments, with the RP-DATA PDU, along with the SMS message 202. In other example embodiments, the IE may be sent as a separate message to one or both of the eNodeB 120 and/or mobile communications network 130 indicating that the communications connection is to remain established for a predetermined period of time. In some example embodiments, the IE 204 may be transmitted in a radio link control (RLC) protocol, media access control (MAC) protocol, packet data convergence protocol (PDCP), or as part of L1 signaling or RRC signaling.

As in the example embodiments described with reference to FIG. 1, in these example embodiments, the UE 110 may start the timer 142 once the SMS message 202 and the IE 204 has been transmitted to the mobile communications network 130 via the eNodeB 120, respectively. At that point the UE may enter a WAIT_FOR_RP-ACK state, where the UE and the processor(s) thereon are expecting an RP-ACK from the mobile communications network 130 responsive to the SMS message 202 transmitted as RP-DATA to the mobile communications network 130. Due to the transmission of the IE 204, in example embodiments, the communications connection may be maintained 208 between the UE 110 and the eNodeB 120 supporting the NAS signaling communicative connection with the mobile communications network 130. In other words, the IE 204, as transmitted by the UE 110 contemporaneously with the SMS message 202, provides an indication to the eNodeB 120 that the communicative connections (e.g., RRC connection) are to be maintained for the purposes of further messaging between the UE 110 and the mobile communications network 130. As a result, the RP-ACK 210 may be received by the UE 110 from the mobile communications network 130 via the eNodeB 120. Furthermore, the UE 110 may send the CP-ACK 212 responsive to receiving the RP-ACK 210. As a result of the communications connection being maintained until the RP-ACK 210 and the CP-ACK 212 are transmitted, the possibility of duplication of the SMS message 140 from the UE 110 is reduced and/or eliminated.

In further alternative example embodiments, duplication of the SMS message may be prevented on the mobile communications network 130 end. In these example embodiments, when the SMS message is transmitted by the UE 110 to the mobile communications network 130 via the eNodeB 120, the mobile communications network may determine if the SMS message, as received as an RP-DATA PDU was received in an error free state (e.g., uncorrupted during transmission). If it is determined by one or more elements of the mobile communications network 130 that the SMS message had been received by the mobile communications network 130 in an error free state, then the mobile communications network may transmit an RP-ACK to the UE 110 and await a CP-ACK to confirm the transmitted RP-ACK. The mobile communications network may transmit the SMS message as RP-DATA to the mobile terminating UE only after a CP-ACK is received by the mobile communications network 130.

Figure 3:
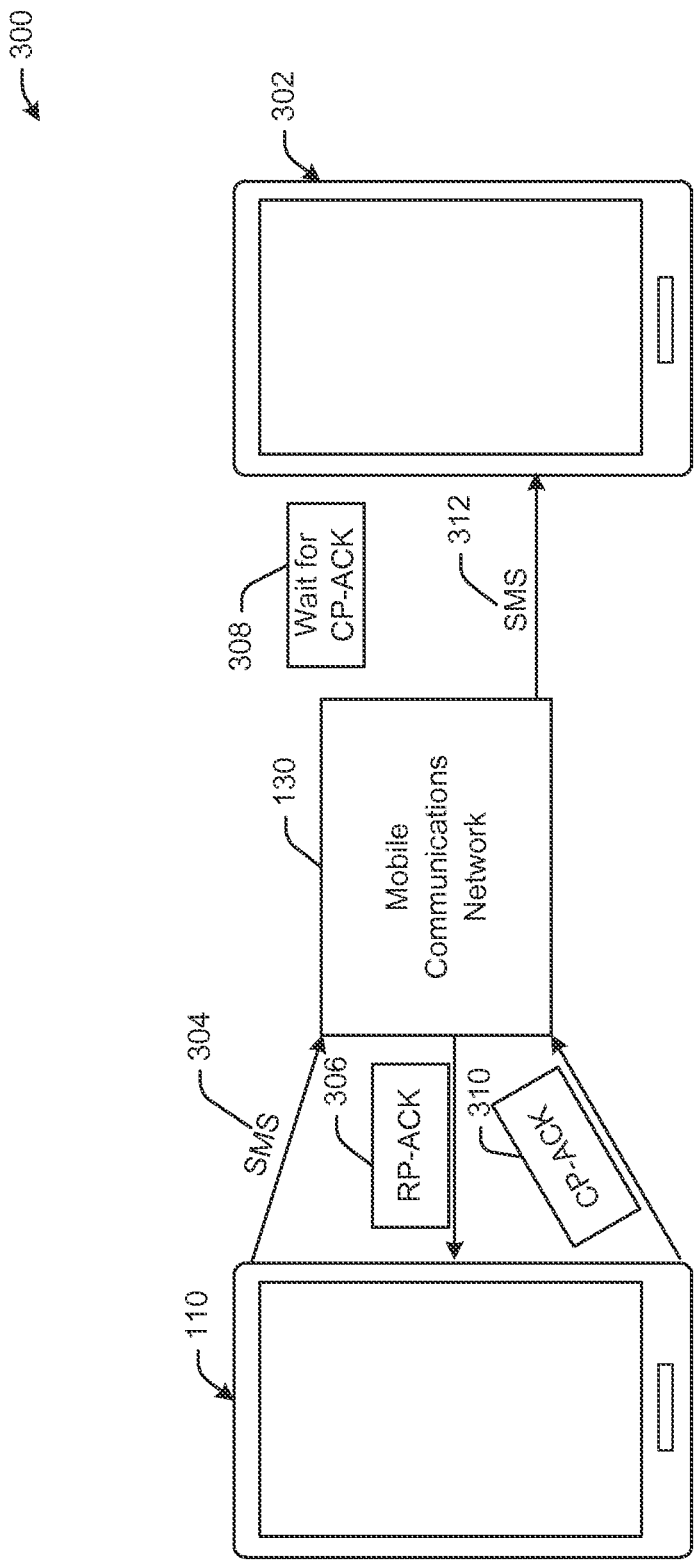
FIG. 3 is a schematic diagram that illustrates yet another example environment where a mobile communications network delivers an SMS message to a recipient user equipment after receiving an acknowledgement from the SMS message sending user equipment, in accordance with example embodiments of the disclosure.

These example embodiments, where duplication of SMS message transmissions are prevented at the mobile communications network 130 may be understood with reference to FIG. 3. FIG. 3 is a schematic diagram that illustrates yet another example environment 300 where a mobile communications network 130 delivers an SMS message 304 to a recipient user equipment (UE) 302 after receiving an acknowledgement (CP-ACK) 310 from the SMS message sending user equipment 110, in accordance with example embodiments of the disclosure. As depicted, the mobile originating UE 110 may send the SMS message 304 via an RRC connection supporting a NAS signaling connection via an eNodeB 120 to the mobile communications network 130. The mobile communications network 130, upon receiving the SMS message 304 as a RP-DATA PDU, may evaluate whether the SMS message 304 was received in an uncorrupted state. If it is determined that the SMS message was received in an uncorrupted state, then the mobile communications network 130 may generate and transmit an acknowledgement (RP-ACK) 306 to the mobile originating UE 110. The mobile communications network 130 may also enter into a wait for CP-ACK state 308. At this point, the acknowledgement from the mobile originating UE (CP-ACK) 310 may be received from the mobile originating UE 110. Upon receiving the CP-ACK 310, the mobile communications network 130 may transmit the SMS message 312 to the mobile terminating UE 302.

It will be appreciated that by waiting to receive the CP-ACK 310 from the mobile originating UE 110 prior to transmitting the SMS message 312 to the mobile terminating UE 302, the mobile communications network 130 ensures that the mobile originating UE 110 had received the RP-ACK and will, therefore, not retransmit the SMS message 304 to the mobile communications network 130. As a result, the SMS message 312 may not be transmitted mobile terminating UE 302 until the mobile communications network 130 determines via receipt of the CP-ACK 310 that the SMS 304 will not be duplicated from the mobile originating UE 110. Therefore, duplicate transmissions of the SMS message 312 to the mobile terminating UE 302 may be prevented.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 4:
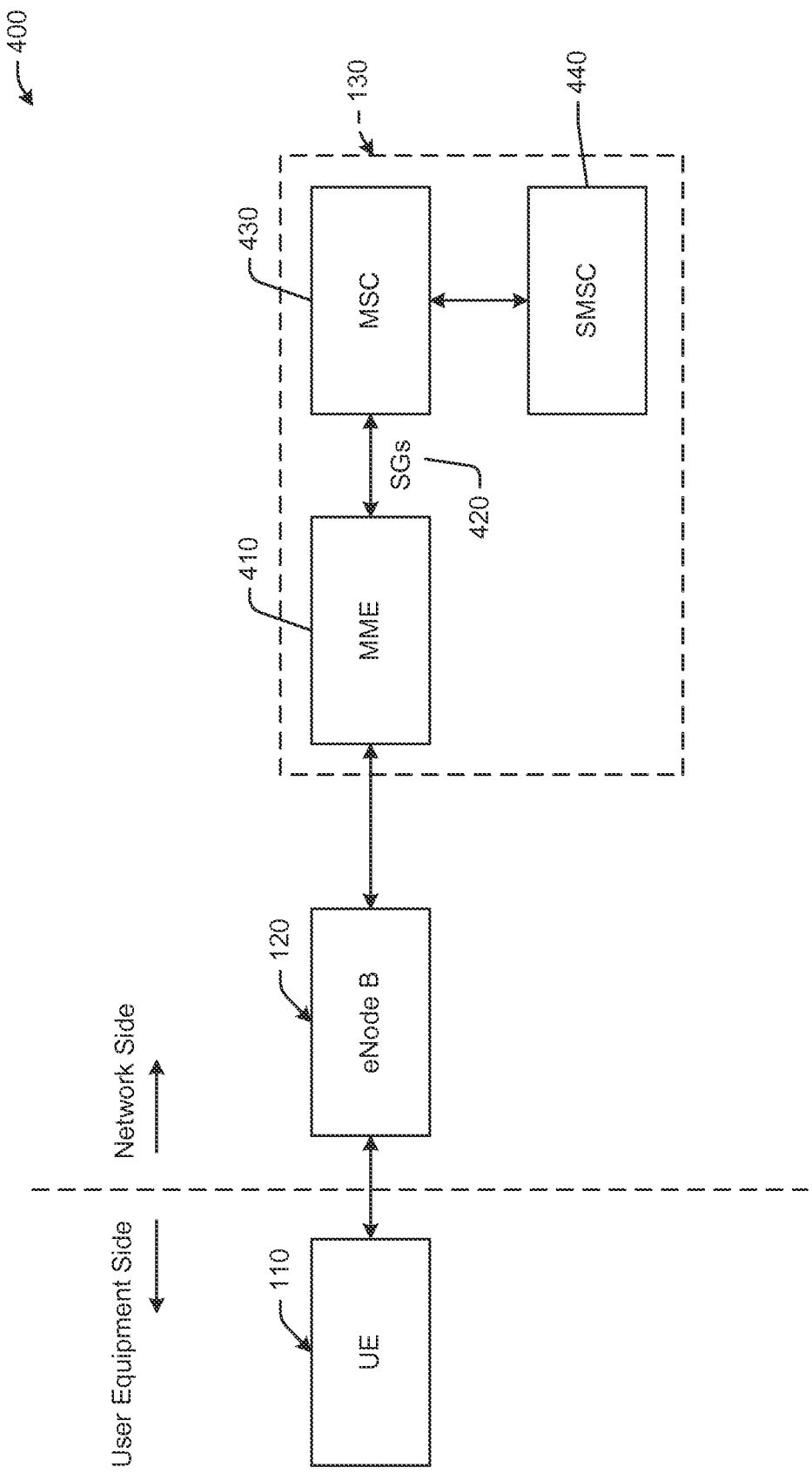
FIG. 4 is a block diagram that illustrates an example environment where the user equipment of FIGS. 1, 2, and 3 interact with the mobile communications network to provide a response to a received SMS message, in accordance with example embodiments of the disclosure.

FIG. 4 is a block diagram that illustrates an example environment where the user equipment 110 of FIGS. 1, 2, and 3 interact with the mobile communications network 130 to provide a response to a received SMS message 140, in accordance with example embodiments of the disclosure. The user equipment side may include the UE 110. The network side may include the eNodeB 120, the mobile management entity (MME) 410, the mobile switching center (MSC) 430, and a service message service center (SMSC) 440. The MME 410 and the MSC 430 may be configured to establish a communicative connection therebetween as SG interface 420.

The UE 110, in example embodiments, may be any type of communications device that can connect to a mobile communications network 130. In example embodiments, the UE 110 may be any suitable communications device including, but not limited to, a mobile phone, a smartphone, a tablet computing device, an electronic book (ebook) reader, wearable devices, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like. The mobile communications network 130, in example embodiments, may be a fourth generation (4G) network and/or a long term evolution (LTE) network. In other example embodiments, the mobile communications network 130 may be a third generation (3G), code division multiple access (CDMA) network, a time division multiple access (TDMA) network, a global system for mobile communication (GSM), or any other suitable mobile communication network.

In example embodiments, the SMSC 440 may be configured to initiate the transfer of SMS messages. A service report that is provided by the UE 110 responsive to a transmitted SMS message 140 may ultimately be provided to the SMSC 440 via the eNodeB 120, MME 410, and the MSC 430. The SMSC 440 may further be configured to route a SMS message 140 to one of a number of MSCs 430 that may be configured to route the SMS message 140 to the intended mobile terminating UE 302. In example embodiments, the SMSC 440 may be configured to receive a SMS message 140 from a first UE 110 (e.g., a mobile originating UE 110) via other elements of the mobile communications network 130 and then route that SMS message 140 to the MSC 430 associated with the intended recipient UE 302 (e.g., mobile terminating UE 302).

The MSC 430 may be configured to receive an SMS message 140 intended for a particular UE 302 from the SMSC 440 and route the SMS message 140 to that particular UE 302. The MSC 430 may be configured to provide circuit switched services. The MSC 430 may be configured to establish a communicative connection (e.g., SG interfaces 420) with the MME 410 to transfer SMS messages 140 to the MME 410 for further transfer to the destination UE 302 as NAS encapsulated RP-DATA. The MSC 430 is still further configured to provide a paging request to the MME 410 for paging the UE 110 and/or UE 302 when there is a voice call and/or SMS message 140 intended for the UE 110, 302. The MSC 430 may also be configured to be informed by the MME 410 of a service request message originating from the UE 110. The service request message from the UE 110 may indicate to the mobile communications network 130 that the UE 110 would like to establish a communicative connection with the mobile communications network 130 via a relatively proximal eNodeB 120. The MSC 430, responsive to the indication of a service request originating from the UE 110 may be configured to cooperate with the MME 410 to establish communications therebetween via the SG interface 420.

The MSC 430 may also have a timer (TR1N) with a threshold time associated therewith. For example, the threshold time may be approximately 35 second. In another example, the threshold time may be 45 seconds. The MSC 430 may be configured to use the timer TR1N to wait until the threshold time expires after transmitting an SMS message to the UE 302 to expect a response report from the UE 110 of RP-ACK or RP-ERR. Additionally, the MSC 430 may be configured to use the timer TR1N to wait until the threshold time expires after receiving a SMS message from the UE 110 to expect a response report from the UE 110 of CP-ACK. If a response report is not receive within the expiration of the timer, then the MSC 430 may be configured to cache the SMS message for later transmission and/or assume that the RP-ACK transmitted to the mobile originating UE 110 had not been properly received by the mobile originating UE 110. Therefore, in some cases, if the MSC 430 does not receive a CP-ACK form a mobile originating UE 110, then the MSC may assume that the mobile originating UE 110 may retransmit the SMS message 140 to ensure that the SMS message 140 is receive by the MSC 430.

MME 410, in example embodiments, may be a control node for the mobile communications network 130, such as a long term evolution (LTE) network. The MME 410 may be configured to provide idle mode UE 110 paging and tagging procedure including retransmissions. In idle mode paging, the MME 410 may be configured to page the UE 110 via a number of eNodeB 120, as the exact mobile cell location of the UE 110 may not be known. The MME 410 may further be configured to receive a service request from a mobile originating UE 110 via an eNodeB and responsive to the service request, establish a NAS signaling communicative connection with the mobile originating UE 110 via an RRC connection between the UE 110 and the eNodeB 120. The MME 410 may also be configured to authenticate the UE 110 for the purposes of transmitting and/or receiving SMS messages 140 and/or voice calls. The Non-Access Stratum (NAS) signaling connection may also terminate, in example embodiments, at the MME 410 and may provide a conduit for communications between the MME 410 and the UE 110 via the RRC connection established between the UE 110 and the eNodeB 120.

Figure 5:
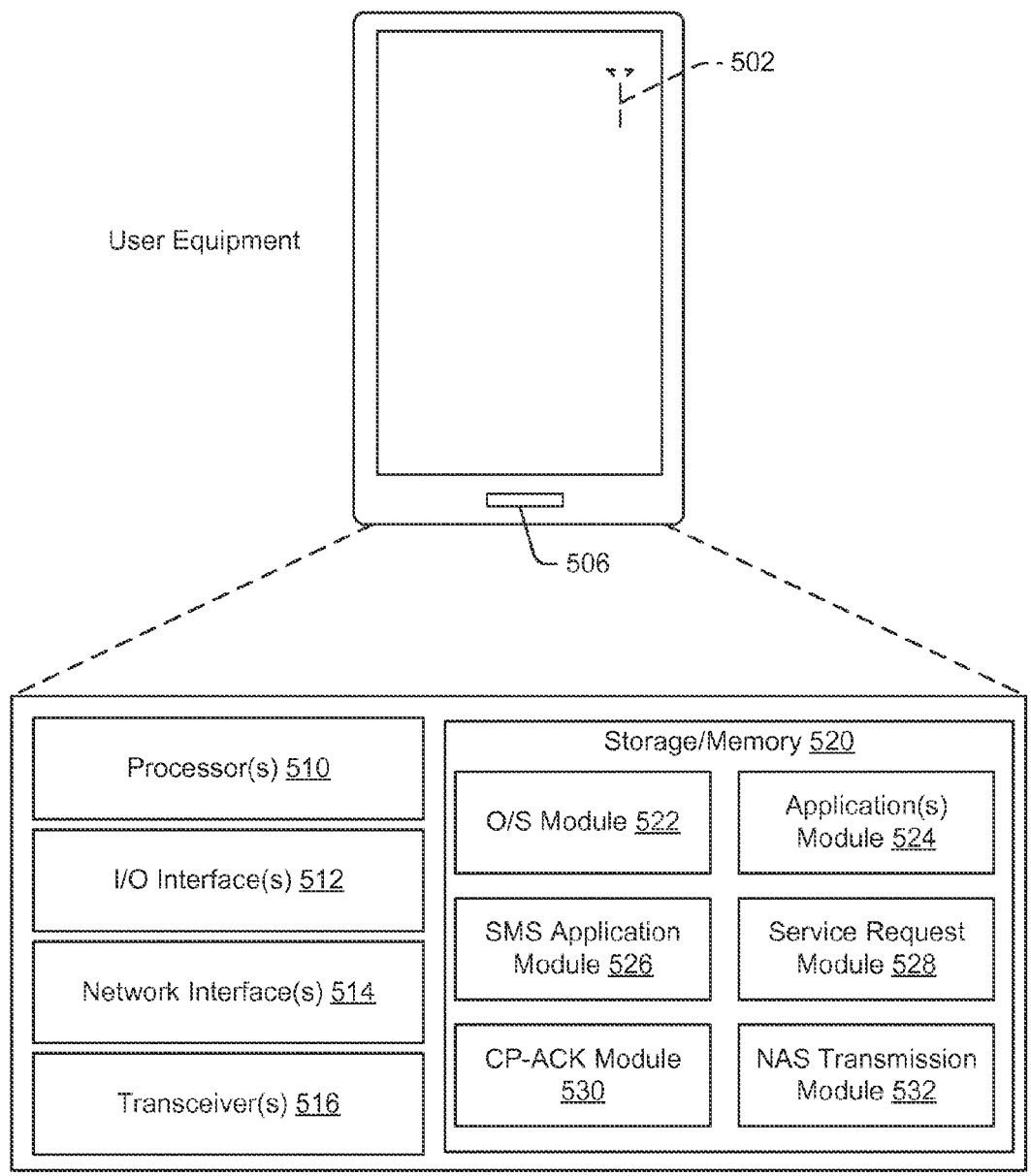
FIG. 5 is a block diagram illustrating an example user equipment, in accordance with example embodiments of the disclosure.

FIG. 5 is a block diagram illustrating an example user equipment 110, in accordance with example embodiments of the disclosure. The UE 110 may include one or more antenna(s) 502, one or more user interface(s) 506, one or more processor(s) 510, one or more input/output (I/O) interface(s) 512, one or more network interface(s) 514, one or more transceiver(s) 516, and one or more storage or memories 520.

The antenna(s) 502 may be any suitable type of antenna corresponding to the communications protocols used by the UE 110. Some non-limiting examples of suitable communications antenna(s) 502 include LTE, 4G, and/or 3GPP TS 24.011 standards compatible antennas, directional antennas, non-directional antennas, dipole antennas, folded dipole antennas, patch antennas, multiple-input multiple-output (MIMO) antennas, or the like. The antenna(s) 502 may be communicatively coupled to the one or more transceiver(s) 516 to transmit and/or receive signals, such as wireless signals for communicating with the eNodeB 120 and the mobile communications network 130.

The user interface(s) 506 may include any variety of interfaces by which a user may interact with the UE 110. These user interface(s) 506 may provide a mechanism for user input to the UE 110, output to the user by the UE 110, or both input and output from/to the user. Some example user interface(s) 506 may include touch sensitive screens, buttons, switches, microphones, speakers, haptic devices/vibrators, mice, keyboards, combinations thereof, or the like. The user interface(s) 506 may be configured to interact with the processor(s) 510 enabled by the I/O interface(s) 512 of the UE 110. In example embodiments, the user interface(s) 506 may enable a user to enter a text message into the UE 110, view a text message on the UE 110, or otherwise interact with one or more text message applications on the UE 110.

In some examples, the processor(s) 510 of the UE 110 may be implemented as appropriate in hardware, software, firmware, or combinations thereof. Software or firmware implementations of the processors 510 may include computer-executable or machine-executable instructions written in any suitable programming language to perform the various functions described. Hardware implementations of the processors 510 may be configured to execute computer-executable or machine-executable instructions to perform the various functions described. The one or more processor(s) 510 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The UE 110 may also include a chipset (not shown) for controlling communications between the one or more processor(s) 510 and one or more of the other components of the UE 110. The one or more processor(s) 510 may also include one or more application specific integrated circuits (ASICs) or application specific standard products (ASSPs) for handling specific data processing functions or tasks.

The I/O interface(s) 512 may enable the UE 110 to receive and/or provide input and/or output from/to the one or more user interface(s) 506. The network interfaces(s) 514 may allow the UE 110 to communicate via network and/or via other communicative channels, such as with the eNodeB 120.

The transmitter/receiver (transceiver) 516 or radios may include any suitable radio for transmitting and/or receiving radio frequency (RF) signals in the bandwidth and/or channels corresponding to the communications protocols utilized by the UE 110 (e.g., LTE, 4G, and/or 3GPP TS 24.011 standards). The transceiver 616 may further be configured to transmit or receive signals in communications bands other than LTE or 4G. The transceiver 516 may include hardware and/or software to modulate communications signals according to the pre-established transmission protocols. The transceiver 516 may be configured to communicate at any suitable frequency. The transceiver 516 may include any known receiver and baseband suitable for communicating via the communications protocols of UE 110. The radio component may further include a low noise amplifier (LNA), additional signal amplifiers, an analog-to-digital (A/D) converter, one or more buffers, and/or a digital baseband.

The storage/memory 520 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The storage/memory 520 may store program instructions that are loadable and executable on the processor(s) 510, as well as data generated or received during the execution of these programs. Turning to the contents of the storage/memory 520 in more detail, the storage/memory 520 may include one or more operating systems (O/S) 522, an applications module 524, a SMS application module 526, a service request module 528, a CP-ACK module 530, and a NAS transmission module 532. Each of the modules and/or software may provide functionality for the UE 110, when executed by the processors 510. The modules and/or software may or may not correspond to physical locations and/or addresses in storage/memory 520. In other words, the contents of each of the modules 522, 524, 526, 528, 530, 532 may not be segregated from each other and may, in fact be stored in at least partially interleaved positions on the storage/memory 520.

The O/S module 522 may have one or more operating systems stored thereon. The processor(s) 510 may be configured to access and execute one or more operating systems stored in the (O/S) module 522 to operate the system functions of the UE 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 524 may contain instructions and/or applications thereon that may be executed by the processor(s) 510 to provide one or more services. These instructions and/or applications may, in certain aspects, interact with the (O/S) module 522 and/or other modules of the UE 110. The applications module 524 may have instructions, software, and/or code stored thereon that may be launched and/or executed by the processor(s) 510 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In certain embodiments, the applications that are stored in the applications module 524 and executable by the processor(s) 510 may provide services for receiving, sending, and/or rendering text messages (e.g., SMS messages).

The instructions and/or functionality stored in the SMS application module 526 may be executed by the processor(s) 510 to provide a variety of functionality to the UE 110 pertaining to user interactions for generating SMS messages. The processor(s) 510, by executing instructions stored in the SMS applications module 526, may be configured to send and/or receive one or more SMS message(s). The processor(s) 510 may further be configured to render (e.g., display on a user interface 506 of the UE 110) the received SMS message. The processes enabled by the SMS applications module 526 may allow for user interaction with the UE 110 to generate the SMS message and transmit the same. In example embodiments, the processor(s) 510 may be configured to generate an RP-DATA that encapsulates the SMS message to be transmitted by the UE 110 in a NAS PDU. In example embodiments, the RP-DATA may include a variety of data fields, such as message type, message reference, originator address, destination address, and user data. In example embodiments, the message type may be 3 bits long, the message reference may be 1 octet, the originator address may be 1 to 12 octets, the destination address may be 1 octet, and the user data, or payload, may be 233 octets or less.

In some example cases, the SMS application module 526 may contain instructions therein that when executed by the processor(s) 510, enable the processor(s) 510 to provide one or more additional information elements, such as an information element encoded in one or more data fields of the RP-DATA that indicate that an RRC and/or NAS signaling connection is to remain established for a predetermined time period after the transmission of the RP-DATA from the UE 110 to the eNodeB 120. Alternatively, the processor(s) 510 may be configured to generate a message separate from the RP-DATA that may indicate the RRC and/or NAS signaling connection is to remain established for a predetermined time period after the transmission of the RP-DATA from the UE 110 to the eNodeB 120. In some example embodiments, the message may be transmitted in a radio link control (RLC) protocol, MAC protocol, PDCP, or as part of L1 signaling or RRC signaling to the eNodeB 120 to maintain the RRC connection that supports the NAS signaling connection.

The instructions and/or functionality stored in the service request module 528 may be executed by the processors 510 to provide a variety of functionality to the UE 110 pertaining to establishing an RRC connection and a NAS signaling connection. The processor(s) 510, when the UE 110 is in idle mode, may be configured to receive a page indicating that the mobile communications network 130 wishes to establish a communicative connection with the UE 110. In some cases, this may be to initiate a voice call or because a SMS message is awaiting the UE 110. This page, in example embodiments may be transmitted by more than one eNodeB 120, as directed by the MME 410. The page, in example embodiments, may be a NAS message carried by RRC protocol. Based at least in part on receiving the page, the UE 110 may be configured to provide a service request to establish a RRC connection.

The UE 110 and processor(s) 510 thereon, in example embodiments, by executing instructions stored in the service request module 528 may be configured to transmit a wireless signal carrying a service request via the transceiver 516 and the antenna(s) 502 that may be received by an eNodeB 120 in relative proximity to the UE 110 (e.g., an eNodeB within radio range of the UE 110). The eNodeB 120 receiving an RRC connection request may proceed to cooperate with the UE 110 to establish an RRC connection. Once the RRC connection is established the NAS signaling connection may be supported by the lower layer RRC connection. In other words, an eNodeB 120 receiving the service request from the UE 110 may provide an RRC connection with the UE 110. Using this RRC connection, a NAS signaling connection may be established between the UE 110 and the MME 410. In this way, the UE 110 and the processor(s) 510 thereon may be configured to establish a RRC connection and a NAS signaling connection responsive to identifying that an RRC connection has been severed. In some example cases, the processor(s) 510 may be configured to reestablish a severed RRC connection if the UE 110 is in a WAIT-_FOR_RP-ACK state, where the processor(s) 510 may be awaiting an RP_ACK, or alternatively RP-ERR, responsive to transmitting a NAS PDU encapsulated SMS message (RP-DATA). In some further example embodiments, the processor(s) 510 may be configured to reestablish a severed RRC connection if the UE 110 is in a WAIT_FOR_RP-ACK state and the timer (TRIM) has not expired, where the processor(s) 510 may be awaiting an RP_ACK, or alternatively RP-ERR, responsive to transmitting a NAS PDU encapsulated SMS message (RP-DATA). The processor(s) 510 may further be configured to provide the eNodeB 120 and/or the MME 410 authentication information to enable the establishment of the RRC connection and/or the NAS signaling connection.

The processor(s) 510 may further be configured, by executing the instructions stored in the service request module 528, to identify that a response report (e.g., RP-ACK or RP-ERR) have been received from the MME 410, MSC 430, or other entities of the mobile communications network 130. Furthermore, the processor(s) 510 may identify that the RRC connection and a NAS signaling connection may not be available. In some cases, this might mean that the RRC connection and the NAS signaling connection by which the SMS message was sent may have been released prior to the processor(s) 510 having an opportunity to receive the response report (RP-ACK/RP ERR). Responsive to the determination that the response report for the transmitted SMS message is yet to be received from the MME 410 and MSC 430 and that there is no available RRC or NAS signaling connections, the UE 110 may be configured to reestablish the RRC and NAS signaling connections. In these embodiments, the UE 110 may yet again transmit a wireless signal carrying a RRC connection request via the transceiver 516 and the antenna(s) 502 that may be received by an eNodeB 120 in relative proximity to the UE 110. The eNodeB 120 receiving the RRC connection request may proceed to cooperate with the UE 110 to establish an RRC connection. Once the RRC connection is established the NAS signaling connection may be supported by the lower layer RRC connection.

The instructions and/or functionality stored in the CP-ACK module 530 may be executed by the processor(s) 510 to provide a variety of functionality to the UE 110 pertaining to responding to a received response report (RP-ACK or RP-ERR) from the mobile communications network (e.g., from MSC 430 via MME 410 and eNodeB 120), responsive to the transmitted encapsulated SMS message. The RP-DATA, when sent to the mobile communications network 130, may be de-encapsulated to identify the SMS message, as received from the UE 110 and the processor(s) 510 thereon by the MSC 430. The SMS message may be checked for a variety of possible errors that may have resulted from any variety of sources, such as encoding, encapsulation, transmission, de-encapsulation, or the like. The MSC 430 may be configured to check for errors of exceeding the memory capacity of the MSC 430, invalid short message transfer reference value, semantically incorrect message, invalid mandatory information, message type non-existent or not implemented, message not compatible with short message protocol state, information element non-existent or not implemented, or unspecified protocol error. If an error is not detected by the MSC 430 in the received SMS message for the aforementioned errors, then the MSC 430 may be configured to generate the response report as a message indicating that the SMS message was received without error (RP-ACK). On the other hand, if an error was detected in the SMS message at the MSC 430, then the response report may indicate the same in the form of RP-ERR.

The processor(s) 510, by executing instructions stored in the CP-ACK module 530 may be configured to receive the response report (RP-ACK or RP-ERR), as generated and transmitted by the MSC 430. In example embodiments, the response report may be received after an initial RRC and NAS connection was severed and then re-established by performing a service request with the eNodeB 120 and other elements of the mobile communications network 130. In example embodiments, the response report may be received while the UE 110 is in a WAIT_FOR_RP-ACK state, subsequent to transmitting the RP-ACK to the mobile communications network 130. In certain example embodiments, the timer (TRIM) 142 may be running from when the RD-DATA was sent prior to re-establishing the RRC and NAS communicative link when the RP-ACK/ERR is received from the MSC 430 via the MME 410 and eNodeB 120. Responsive to receiving the response report, the processor(s) 510 may be configured to identify whether the SMS message was received in an error free state (e.g., if an RP-ACK is received) by the MSC 430 or if the SMS message was received with one or more errors (e.g., if an RP-ERR is received) by the MSC 430. If the message was received with errors by the MSC 430, then the processor(s) 510 may be configured to retransmit the SMS message as encapsulated in a NAS PDU as RP-DATA to the MSC 430 via the MME 410 and eNodeB. If, on the other hand, the message was received without errors, then the processor(s) 510 may be configured to transmit, to the MSC 430, a confirmation of receiving the RP-ACK, in the form of a CP-ACK. In this case, the UE would not retransmit the RP-DATA carrying the SMS message, since the processor(s) 510 are aware that the RP-ACK was received by the MSC 430 in an error free state. Furthermore, when the CP-ACK is received by the MSC 430, the MSC is aware that the UE will not retransmit the same SMS message.

The instructions and/or functionality stored in the NAS transmission module 532 may be executed by the processor(s) 510 to provide a variety of functionality to the UE 110 pertaining to transmitting the RP-DATA via the NAS signaling connection, receiving the RP-ACK or RP-ERR via the NAS signaling connection, and sending the CP-ACK via the NAS signaling connection. The RP-DATA may be generated by suitable processes, such as those enabled by SMS application(s) to encapsulate the SMS message and transmit the RP-DATA to the MME 410 to be passed to the MSC 430. Additionally, when the RP-ACK or RP-ERR are received, the processor(s) 510 may be configured to transmit the acknowledgement (CP-ACK) to the MME 410. As discussed above, in example embodiments, the RP-ACK or RP-ERR may be received via the NAS signaling connection after reestablishing the NAS signaling connection responsive to identifying that response report is yet to be received and that the previous NAS signaling connection has been severed. Additionally, the CP-ACK may be transmitted after the NAS signaling connection has been reestablished following identification that the previous NAS signaling connection had been severed.

It will be appreciated that there may be overlap in the functionality of the instructions stored in the one or more operating systems (O/S) module 522, the applications module 524, the SMS application module 526, the service request module 528, the CP-ACK module 530, and the NAS transmission module 532. In fact, the functions of the aforementioned modules 522, 524, 526, 528, 530, 532 may interact and cooperate seamlessly under the framework of the UE 110. Indeed, each of the functions described for any of the modules 522, 524, 526, 528, 530, 532 may be stored in any module 522, 524, 526, 528, 530, 532 in accordance with certain example embodiments of the disclosure. Further, in certain example embodiments, there may be one single module that includes the instructions, programs, and/or applications described within the operating systems (O/S) module 522, the applications module 524, the SMS application module 526, the service request module 528, the CP-ACK module 530, and the NAS transmission module 532.

Figure 6:
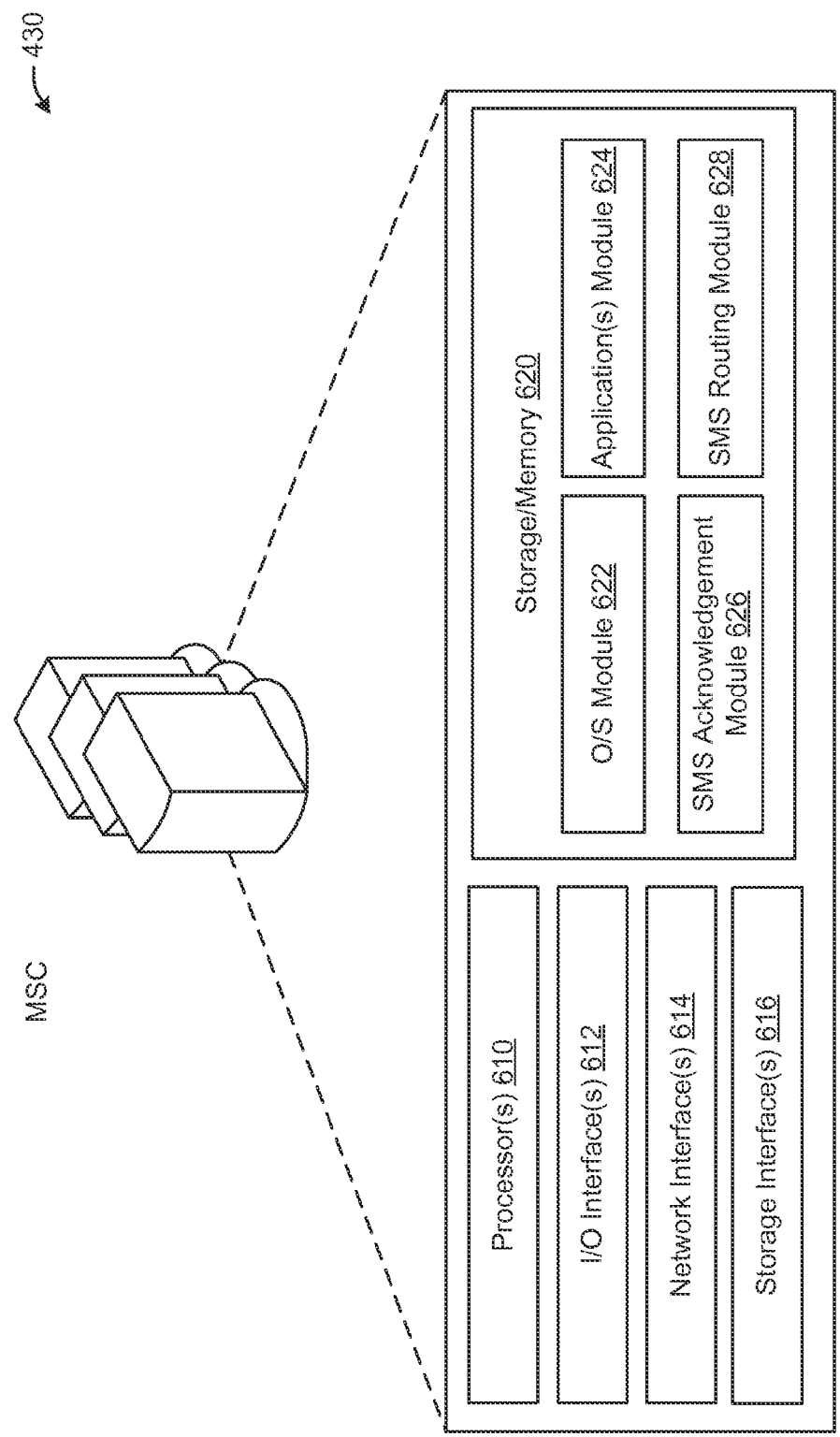
FIG. 6 is a block diagram illustrating an example mobile switch center (MSC), in accordance with example embodiments of the disclosure.

FIG. 6 is a block diagram illustrating an example mobile switch center (MSC) 430, in accordance with example embodiments of the disclosure. The MSC 430 may include one or one or more processor(s) 610, one or more input/output (I/O) interface(s) 612, one or more network interface(s) 614, one or more storage interface(s) 616, and one or more storage or memories 620. The descriptions of the one or one or more processor(s) 610, one or more input/output (I/O) interface(s) 612, one or more network interface(s) 614, and one or more storage or memories 620 may be substantially similar to the descriptions of the one or one or more processor(s) 510, one or more input/output (I/O) interface(s) 512, one or more network interface(s) 514, and one or more storage or memories 520 of the UE 110, as described in conjunction with FIG. 5, and in the interest of brevity, will not be repeated here. The one or more storage interface(s) 616 may enable the MSC 430 and the processor(s) 610 thereon to access, read, and write to the storage/memory 610 and/or other external storage devices and/or databases.

The storage/memory 620 may store program instructions that are loadable and executable on the processor(s) 610, as well as data generated or received during the execution of these programs. Turning to the contents of the storage/memory 620 in more detail, the storage/memory 620 may include one or more operating systems (O/S) 622, an applications module 624, a SMS acknowledgement module 626, and a SMS routing module 628. Each of the modules and/or software may provide functionality for the UE 110, when executed by the processor(s) 610. The modules and/or the software may or may not correspond to physical locations and/or addresses in storage/memory 620. In other words, the contents of each of the modules 622, 624, 626, 628 may not be segregated from each other and may, in fact be stored in at least partially interleaved positions on the storage/memory 620.

The description of the O/S module 622 and the applications module 624 may be substantially similar to the description of the O/S module 522 and the applications module 524 of the UE 110, as described in conjunction with FIG. 5, and in the interest of brevity, will not be repeated here.

If an error is not detected by the MSC 430 in the received SMS message for the aforementioned errors, then the MSC 430 may be configured to generate the response report as a message indicating that the SMS message was received without error (RP-ACK). On the other hand, if an error was detected in the SMS message at the MSC 430, then the response report may indicate the same in the form of RP-ERR.

The processor(s) 610, by executing instructions stored in the SMS acknowledgement module 626, may be configured to receive an RP-DATA encapsulating an SMS message that is to be routed from a mobile originating UE 110 to a mobile terminating UE 302. The processor(s) may be configured to de-encapsulate the SMS message from the NAS PDU encapsulated RP-DATA and determine if the SMS message has been received in an error free state. In example embodiments, the MSC 430 and the processor(s) 610 thereon may be configured to check the SMS message for a variety of possible errors that may have resulted from any variety of sources, such as encoding, encapsulation, transmission, de-encapsulation, or the like. The processor(s) 610 may be configured to check for errors of exceeding the memory capacity of the MSC 430, invalid short message transfer reference value, semantically incorrect message, invalid mandatory information, message type non-existent or not implemented, message not compatible with short message protocol state, information element non-existent or not implemented, or unspecified protocol error.

If it is determined that the SMS message contains one or more errors, then the processor(s) 610 may be configured to generate the response report to be sent to the MME 410 as an indication that the SMS message was received with error(s) (RP-ERR). The RP-ERR, as generated by the processor(s) 610 may include a variety of data fields, such as a message type, a message reference, a cause, and user data. In example embodiments, the message type may be 3 bit long, the message reference may be 1 octet, the cause may be 2 or 3 octets, and the user data may be 234 octets or less. In other words, the RP-ERR may convey to the UE 110 what type of error was detected in the received SMS message. In example embodiments, the user data field may be optional in the RP-ERR. In some example embodiments, the user data field of the RP-ERR may carry error diagnostic information.

If it is determined by the processor(s) 610 that the SMS message is free of errors, such as the errors listed above, then the processor(s) 610 may be configured to generate a response report indicating error free transmission (RP-ACK). The RP-ACK, as generated by the processor(s) 610 may include a variety of data fields, such as a message type, a message reference, and user data. In example embodiments, the message type may be 3 bit long, the message reference may be 1 octet, and the user data may be 234 octets or less. In example embodiments, the user data field may be optional in the RP-ACK. After generating the response report as either RP-ACK or RP-ERR, the processor(s) 610 may be configured to transmit the response report to the UE 110 via the MME 410 and the eNodeB 120. In example embodiments, the RP-ACK/ERR, as transmitted by the MSC 430, may be received by the mobile originating UE 110 after the mobile originating UE 110 connection to the mobile communications network 130 had been severed and then reestablished. In example embodiments, the RP-ACK/ERR, as transmitted by the MSC 430, may be received by the mobile originating UE 110 after the mobile originating UE 110 connection to the mobile communications network 130 had been severed and then reestablished and prior to the timer (TRIM) 142 expiring.

The processor(s) 610, by executing instructions stored in the SMS routing module, may be configured to route an SMS message received from the mobile originating UE 110 to a mobile terminating UE 302. The processor(s) 610 may be configured to transmit the SMS message by encapsulating the SMS message into a NAS PDU (RP_DATA) to be transmitted to the mobile terminating UE 302. The SMS message may be routed to the mobile terminating UE 302 by identifying identifiers, such as the mobile phone number, of the mobile terminating UE 302. The identifying information of the mobile terminating UE 302 may be identified from one or more data fields of the RP-DATA received from the mobile originating UE 110. In example embodiments, the MSC 430 and the processor(s) 610 may be configured to transmit the SMS message to the mobile terminating UE 302 only after a CP-ACK is received from the mobile originating UE 110 responsive to an RP-ACK transmitted to the mobile originating UE 110 indicating error-free receipt of the SMS message. It will be appreciated that by waiting for the CP-ACK at the MSC 430, the MSC 430 is unlikely to receive a duplicate of the SMS message from the mobile originating UE 110. Therefore, the delivery of duplicate SMS messages may be avoided from the mobile communications network 130 to the mobile terminating UE 302.

It will be appreciated that there may be overlap in the functionality of the instructions stored in the one or more operating systems (O/S) module 622, the applications module 624, the SMS application module 626, and the SMS acknowledgement module 628. In fact, the functions of the aforementioned modules 622, 624, 626, 628 may interact and cooperate seamlessly under the framework of the MSC 430. Indeed, each of the functions described for any of the modules 622, 624, 626, 628 may be stored in any module 622, 624, 626, 628 in accordance with certain example embodiments of the disclosure. Further, in certain example embodiments, there may be one single module that includes the instructions, programs, and/or applications described within the operating systems (O/S) module 622, the applications module 624, the SMS application module 626, and the SMS acknowledgement module 628.

Illustrative Processes

Figure 7:
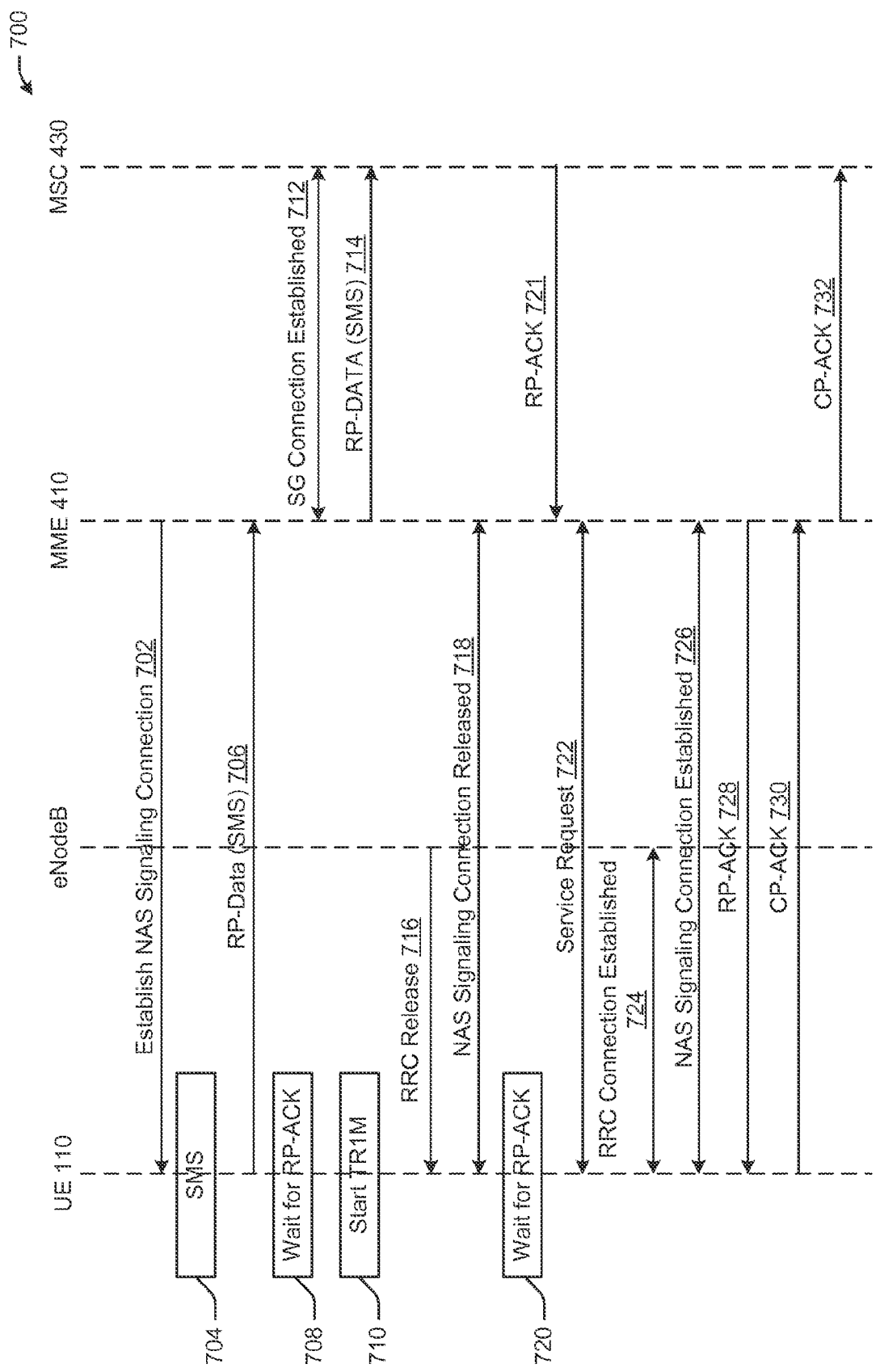
FIG. 7 is a chart illustrating an example set of interactions in the delivery and response to an SMS message, in accordance with example embodiments of the disclosure.

FIG. 7 is a chart illustrating an example set of interactions in the delivery and response to an SMS message, in accordance with example embodiments of the disclosure. As shown, the interactions depicted may be between the UE 110 and the eNodeB 120, MME 410, and the MSC 430.

A NAS signaling connection may be established 702. The NAS signaling connection may be established 702 between the MME 410 and the UE 110, if a NAS signaling connection does not already exist. In some cases, this connection may be preexisting, particularly if the UE 110 is in the process of exchanging data or voice via the eNodeB 120. In example embodiments a wireless signal carrying a service request may be transmitted via the transceiver and the antenna(s) of the UE 110. This service request may be received by an eNodeB 120 in relative proximity to the UE 110 (e.g., eNodeB 120 within radio range of the UE 110). The eNodeB 120 receiving the service request may proceed to cooperate with the UE 110 to establish an RRC connection. Once the RRC connection is established the NAS signaling connection between the UE 110 and the MME 410 may be supported by the lower layer RRC connection. This RRC connection between the UE 110 and the eNodeB 120 may enable higher layer communicative connections and/or protocols, such as Non-Access Stratum (NAS) signaling. The NAS signaling connection may enable communications between the UE 110 and the MME 410 over the RRC connection. The NAS signaling connection may be established 702, in example embodiments, responsive to the UE 110 making a service request, such as by transmitting a service request message or beacon for establishing a communicative connection between the UE 110 and the eNodeB 120 using Radio Resource Control (RRC) protocol at an Access Stratum. It will be appreciated that the service request may be a random access event, where there may be collisions between service requests from multiple UEs at the base station (eNodeB) 120 and therefore, it may be necessary for a particular UE 110 to transmit more than one service request. The service request may carry one or more identification information, such as a unique identification of the UE 110 to the eNodeB 120 to register the UE 110 to the eNodeB 120. The eNodeB 120, based at least in part on the service request, may schedule an active and non-contention connection (e.g., RRC connection) with the UE 110 where spectral bandwidth and time slots may be allocated for RRC communications between the eNodeB 120 and the UE 110. Once the eNodeB 120 establishes a RRC connection, a service request may be sent to the MME 410 to establish the NAS signaling connection supported by the RRC connection. This operation may be optional in some example embodiments, such as when a NAS signaling connection had already been in effect between the UE 110 and the MME 410.

It may be determined that there is a pending SMS message 704 to be sent from the UE 110 to the MSC 430 for transmission to a mobile terminal UE 302. The destination UE 302 for the SMS message may be determined by the MSC 430 to interact with the appropriate MME 410 associated with the determined destination UE 302. The SMS message may be encapsulated in a NAS protocol data unit (PDU), as data (RP-DATA), by the UE 110, for transmission 706 via the NAS signaling connection from the UE 110 to the MME 410 of the mobile communications network 130. The SMS message encapsulated into a NAS PDU as RP-DATA may be transmitted 308 by the UE 110 to the MME 410 for delivery to the MSC 430 for further delivery to the mobile terminating UE 302. Once the RP-DATA is transmitted, the UE 110 may enter a WAIT_FOR_RP-ACK state 708. In this state, the UE 110 may wait to receive confirmation from the MSC 430 that the SMS message was received in an error free state. At this point, at the UE 110, a timer (TRIM) may be started 710. This timer may measure the time elapsed from the point when the SMS as RP-DATA is transmitted to the MME 410. The timer may be used to determine if a threshold time has elapsed (e.g., set to between approximately 20 seconds to approximately 35 seconds) for receiving an RP-ACK from the MSC 430.

SG connection may be established 712 between the MME 410 and the MSC 430, if a SG connection does not already exist. The SG connection may be established to enable communication between the MME 410 and the MSC 430. This SG interface connection may be used, subsequently to transfer 714 the RP-DATA (SMS message) from the MME 410 to the MSC 430.

In example embodiments, the RRC connection between the UE and the eNodeB may be released 716 for any variety of reasons. In some cases, if there are no other data to transmit or other transactions to perform between the mobile communications network 130 and the UE 110, then the eNodeB 120 may release the RRC connection. This may be done in an effort to more effectively allocate communications bandwidth by a spatially distributed collection of eNodeB 120 that are serving a relatively large number of UE 110, particularly in areas with a high population density, such as cities, or to handle UE 110 that may be in motion across eNodeB 120 coverage areas. Since the RRC connection supports the NAS signaling connection, when the RRC connection is terminated 716, the NAS signaling connection is also released 718. At this point, the UE 110 may not have a communicative connection with which to communicate and/or transfer data and/or messages with the mobile communications network 130. In example embodiments, the RRC connection and the NAS signaling connection may be released from the network side, such as by the MME 410 because the MME 410 may not track that the MSC 430 and/or the UE 110 has a response report pending. In other words, the MME 410 may not know if the UE 110 has any data or messages to receive and/or transmit and, if there are no other reason to not place the UE 110 in idle mode, then the MME 410 may terminate the NAS signaling connection and the eNodeB 120 may release the RRC connection.

The UE 110, in some example embodiments, may be notified when the RRC connection is to be released by the eNodeB 120 and/or the MME 410. In other example embodiments, the UE 110 may detect when the RRC connection has been severed, such as by detecting a loss of radio coverage and/or communication with the eNodeB 120. In yet other example embodiments, the UE 110 may be configured to identify that the RRC connection has been severed when attempting to transmit a message, such as a response report, ping, of link status message (e.g., RLC protocol message) via the previously established connection. In still other example embodiments, the RRC connection may be terminated from the UE 110 side due to a weak wireless signal or loss of wireless signal for connecting with the eNodeB 120.

When the RRC connection and NAS signaling connection are released, in example embodiments, the UE may remain in the WAIT_FOR_RP-ACK state 720. In other words, the UE 110 may still be expecting the RP-ACK even after the communicative connections to the mobile communications network had been severed. In this case, if the communicative connections are reestablished, then, from the perspective of the UE 110, the exchange of acknowledgements and/or confirmations may still be performed. At this point, the MSC 430 may generate and send a response report, such as RP-ACK 721 that acknowledges that the SMS message was received in an error-free state. This RP-ACK 721 may be received by the MME 410, which may, in turn, prompt the MME 410 to establish a communicative connection with the UE 110 to transmit the RP-ACK to the UE 110. This may prompt the MME 410 to page the UE 110.

As a result, of the UE 110 not being communicatively connected to the eNodeB 120 and having to receive the response report from the MME 410, the UE 110, in example embodiments may reestablish the RRC connection 722, 724. This may entail, in example embodiments, the UE 110 sending a service request 722. This service request may be while the UE 110 is in an idle state (e.g., not communicatively linked to the eNodeB 120). As indicated above, the service request may or may not be prompted by a page. In example embodiments, the UE 110 may attempt to reestablish the communications connections based at least in part by recognizing that it is still in a WAIT_FOR_RP-ACK state and that the timer (TRIM) has not yet reached the threshold time elapsed. After establishing the RRC connection 724, the UE 110 may establish the NAS signaling connection 726 with the MME 410. The NAS signaling connection may be established 726 on top of the RRC connection.

At this point, the MSC 430 may determine if the SMS message was received in an error-free state. Whether the SMS message was received in an error-free state may be determined by checking for a variety of potential errors. The SMS message may be checked for a variety of possible errors that may have resulted from any variety of sources, such as encoding, encapsulation, transmission, de-encapsulation, or the like. The processor(s) 610 of the MSC 430 may check for errors of exceeding the memory capacity of the MSC 430, invalid short message transfer reference value, semantically incorrect message, invalid mandatory information, message type non-existent or not implemented, message not compatible with short message protocol state, information element non-existent or not implemented, or unspecified protocol error. In some example embodiments, higher layer errors associated with the SMS may also be checked. For example, SMS encoding failures or SMS application errors of the SMS failure may be detected. As a result of checking the received SMS message for errors, the MSC 430 and the processor(s) 620 thereon may determine that there are no errors and generate an RP-ACK as a response report to be transmitted 728 to the UE 110 via the MME 410 and the eNodeB 120.

If the RP-ACK is received 728 before the timer (TRIM) expires or otherwise reaches a threshold time elapsed, then the UE 110 and the processor(s) 510 thereon may generate a CP-ACK as a confirmation of receiving the RP-ACK. Next the CP-ACK may be transmitted 730 to the MME 410 and then transmitted 732 to the MSC 430.

It will be appreciated that in the operations as shown in FIG. 7, a duplication of the SMS message that may otherwise occur due to the released RRC connection 716 may be avoided, since the UE 110 subsequently reestablishes the RRC connection 724 and the NAS signaling connection 726 to continue to wait in a WAIT_FOR_RP-ACK state for the RP-ACK from the MSC 430. By receiving the RP-ACK 728, the UE 110 and the processor(s) 510 thereon may identify that a duplicate of the SMS message does not need to be sent, since the MSC had already received the SMS in an error free state.

Figure 8:
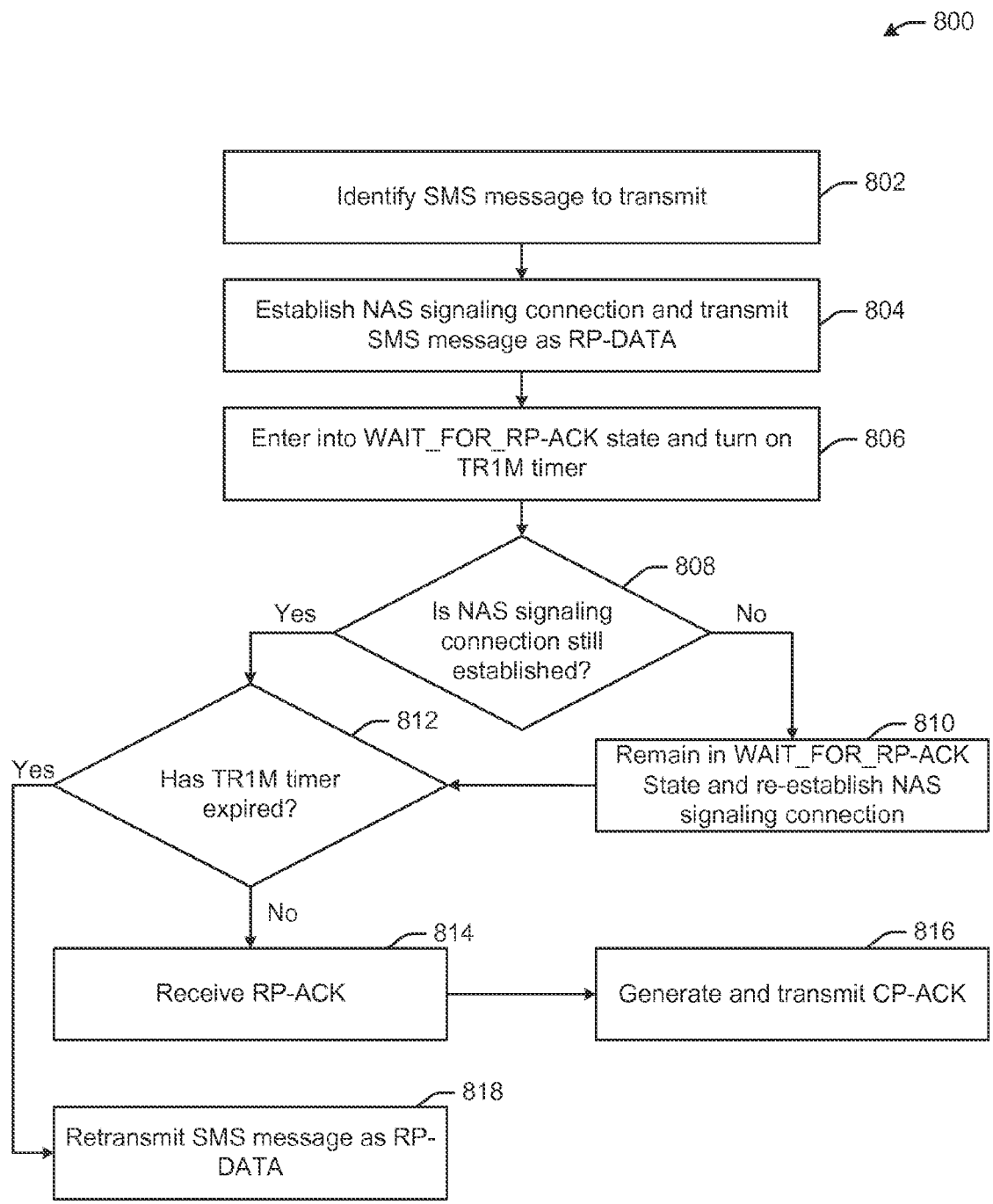
FIG. 8 is a flow diagram illustrating an example method for the user equipment of FIG. 4 to send an SMS message, in accordance with example embodiments of the disclosure.

FIG. 8 is a flow diagram illustrating an example method 800 for the user equipment of FIG. 4 to send an SMS message, in accordance with example embodiments of the disclosure. This method 800 may be performed by the UE 110 and the processor(s) 510 thereon in cooperation with one or more entities of environment 400, such as the MME 410.

At block 802, an SMS message to be transmitted may be identified. In example embodiments, the SMS message may be identified at an application level as a user interacts with a text message application on the UE 110. Once a user enters an SMS message via one or more user interfaces on the UE 110, the processor(s) 510 may be aware of the SMS message to be transmitted by the UE 110.

At block 804, a NAS signaling connection may be established and the SMS may be transmitted as RP-DATA. An RRC connection and a NAS signaling connection may be established. This connection in some example embodiments may be prompted by the UE 110 being in an idle state and providing a service request to the eNodeB 120 indicating that there is a service (e.g., SMS message, voice call, etc.) that the UE 110 is to perform. In example embodiments, the UE 110 may send a RRC request to connect to the eNodeB 120 and the MME 410. The UE 110, in example embodiments, may transmit a wireless signal carrying the RRC request via the transceiver 516 and antenna(s) 502 of the UE 110 that may be received by an eNodeB 120 in relative proximity to the UE 110 (e.g., an eNodeB within radio range of the UE 110). The eNodeB 120 receiving the RRC request may proceed to cooperate with the UE 110 to establish an RRC connection. Once the RRC connection is established, the UE 110 may cooperate with the MME 410 to establish a NAS signaling connection that may be supported by the lower-layer RRC connection. The eNodeB 120 and the MME 410 may grant a connection with the UE 110 such that the UE 110 may communicate with the eNodeB 120 via access stratum layer (e.g., RRC protocol) and communicate with MME 410 using non-access stratum (NAS) layer protocol. The SMS message may be NAS encapsulated as RP-DATA. The RP-DATA may be transmitted via the NAS signaling connection supported by the RRC connection. In example embodiments, the RP-DATA may include a variety of data fields, such as message type, message reference, originator address, destination address, and user data. In example embodiments, the message type may be 3 bits long, the message reference may be 1 octet, the originator address may be 1 to 12 octets, the destination address may be 1 octet, and the user data, or payload, may be 233 octets or less.

At block 806, a WAIT_FOR_RP-ACK state may be entered and the TRIM timer may be turned on. The UE 110 may enter into a WAIT_FOR_RP-ACK state, where the UE 110 is expecting a RP-ACK responsive to the RP-DATA SMS message that it transmitted to the mobile communications network 130 via the eNodeB 120 at block 804.

At block 808, it may be determined if the NAS signaling connection is still established. This determination of whether the RRC connection and NAS signaling connection are still active may be performed in any of a variety of suitable ways. The UE 110, in some example embodiments, may be notified when the RRC connection is to be released by the eNodeB 120 and/or the MME 410. In other example embodiments, the UE 110 may detect when the RRC connection has been severed, such as by detecting a lack of handshaking messages and/or pings from the eNodeB 120. In yet other example embodiments, the UE 110 may be configured to identify that the RRC connection has been severed when attempting to transmit a message, such as the response report via the previously established connection. In still other example embodiments, the RRC connection may be terminated from the UE 110 side due to a weak wireless signal or loss of wireless signal for connecting with the eNodeB 120. In this case, the UE 110 and the processor(s) 510 thereon may identify that the wireless signal is below a threshold to support the RRC connection and, therefore the NAS signaling connection.

If it is determined, at block 808, that the NAS signaling connection has been severed, then at block 810, the UE may remain in a WAIT_FOR_RP-ACK state and the NAS signaling connection may be reestablished. The UE 110 may remain in a WAIT_FOR_RP-ACK state, therefore, even after the communications connection had been severed. In example embodiments, the timer TRIM may continue to track the time after the SMS message was transmitted by the UE 110 even after the communications connection had been severed. In further example embodiments, the UE 110 may remain in a WAIT_FOR_RP-ACK state and continue to track the time since transmitting the SMS message with the timer TRIM even after the communications connection had been reestablished. In some example embodiments, the NAS signaling connection may be reestablished by the UE 110 responsive to paging from the MME 410 to indicate to the UE 110 that a response report (RP-ACK/RP-ERR) is awaiting the UE 110. As a result, the UE 110 may generate and send a service request to the eNodeB 120 to reestablish the RRC connection and the NAS signaling connection.

At block 812, it may be determined if the TRIM timer had expired. In other words, it may be determined if the TRIM timer had reached a threshold time elapsed value from the time that the SMS message was sent as RP-ACK at block 804. If it is determined, at block 812, that the TRIM timer had not expired, then at block 814, the RP-ACK may be received. This response report may be transmitted to the UE 110 from the MME 410 via the NAS signaling connection. Therefore, had the initial NAS signaling connection been severed, the NAS signaling connection is reestablished while the UE 110 remains in the same state, expecting the RP-ACK while the timer TRIM still runs. At block 816, the CP-ACK may be generated and transmitted. The CP_ACK may be transmitted to the MSC 430 via the NAS signaling connection that was either established at block 804 or reestablished at block 810. If, however, the TRIM timer had expired, as determined at block 814, then at block 818, the SMS message may be retransmitted as RP-DATA.

After that, the method 800 may proceed to block 808, if it was determined that the NAS signaling connection was not severed, then the method 800 may directly proceed to block 812 where the RP-ACK may be received. The RP-ACK may be received from the MSC 430 and may indicate that the SMS message of block 802 was received by the MSC 430 without any errors.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
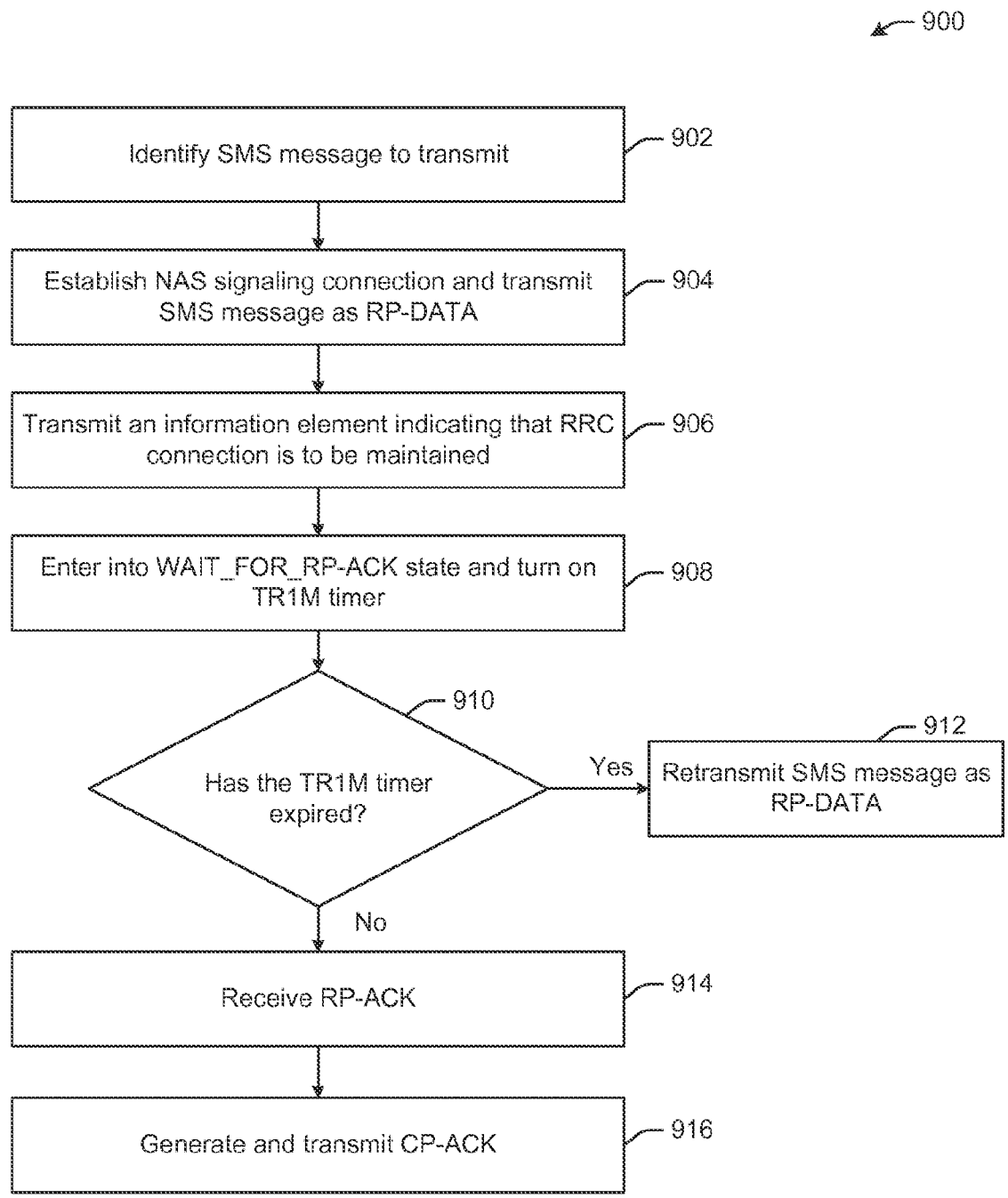
FIG. 9 is a flow diagram illustrating an another example method for the user equipment of FIG. 4 to send an SMS message, in accordance with example embodiments of the disclosure.

FIG. 9 is a flow diagram illustrating an another example method for the user equipment of FIG. 4 to send an SMS message, in accordance with example embodiments of the disclosure. This method 900 may be performed by the UE 110 and the processor(s) 510 thereon in cooperation with one or more entities of environment 400, such as the MME 410.

At block 902, an SMS message to be transmitted may be identified. In example embodiments, the SMS message may be identified at an application level as a user interacts with a text message application on the UE 110. Once a user enters an SMS message via one or more user interfaces on the UE 110, the processor(s) 510 may be aware of the SMS message to be transmitted by the UE 110.

At block 904, a NAS signaling connection may be established and the SMS may be transmitted as RP-DATA. An RRC connection and a NAS signaling connection may be established. This connection in some example embodiments may be prompted by the UE 110 being in an idle state and providing a service request to the eNodeB 120 indicating that there is a service (e.g., SMS message, voice call, etc.) that the UE 110 is to perform. In example embodiments, the UE 110 may send a RRC request to connect to the eNodeB 120 and the MME 410. The UE 110, in example embodiments, may transmit a wireless signal carrying the RRC request via the transceiver 516 and antenna(s) 502 of the UE 110 that may be received by an eNodeB 120 in relative proximity to the UE 110 (e.g., an eNodeB within radio range of the UE 110).

At block 906, an information element or control message indicating that the RRC connection is to be maintained may be transmitted. The control message may be in the form of information element(s) (IE) that indicate that a communicative connection is to remain established for additional communication. The information elements may indicate that the eNodeB 120 is to maintain the RRC connection and the NAS signaling connection maintained thereon for a predetermined period of time, such that acknowledgement transactions may be performed between the UE 110 and the mobile communications network 130. The IE may be incorporated, in example embodiments, with the RP-DATA PDU, along with the SMS message. In other example embodiments, the IE may be sent as a separate message to one or both of the eNodeB 120 and/or mobile communications network 130 indicating that the communications connection is to remain established for a predetermined period of time. In some example embodiments, the IE may be transmitted in a radio link control (RLC) protocol, MAC protocol, PDCP, or as part of L1 signaling or RRC signaling.

In some example embodiments, the information element or control message may carry an indication of how long to maintain the RRC connection and the NAS signaling connection. In some cases, the NAS signaling connection may be maintained for a period of time equivalent to the full threshold elapsed time, or otherwise the full amount of time during which the UE 110 may receive the RP-ACK form the eNodeB 120. In example embodiments, this threshold time may be approximately 35 seconds in duration. In other cases, the indication of how long to maintain the RRC connection may be the period of time remaining from the threshold time during which the RP-ACK may be received. In this case, the time for which the connection is to be maintained may be approximately the threshold time (e.g., 35 s) minus the already elapsed amount of time from when the SMS message was sent.

At block 908, a WAIT_FOR_RP-ACK state may be entered and the TRIM timer may be turned on. The UE 110 may enter into a WAIT_FOR_RP-ACK state, where the UE 110 is expecting a RP-ACK responsive to the RP-DATA SMS message that it transmitted to the mobile communications network 130 via the eNodeB 120 at block 904.

At block 910, it may be determined if the TRIM timer has expired. In other words, it may be determined if the TRIM timer had reached a threshold time elapsed value from the time that the SMS message was sent as RP-ACK at block 904. At block 912, if it is determined that the TRIM timer had indeed expired, then the SMS message may be retransmitted as RP-DATA at block 912. On the other hand, if the TRIM timer had not expired, at block 914, RP-ACK may be received. This response report may be transmitted to the UE 110 from the MME 410 via the NAS signaling connection. Responsive to receiving the RP-ACK, the UE 110 and the processor(s) 510 thereon may generate and transmit a CP-ACK.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

Figure 10:
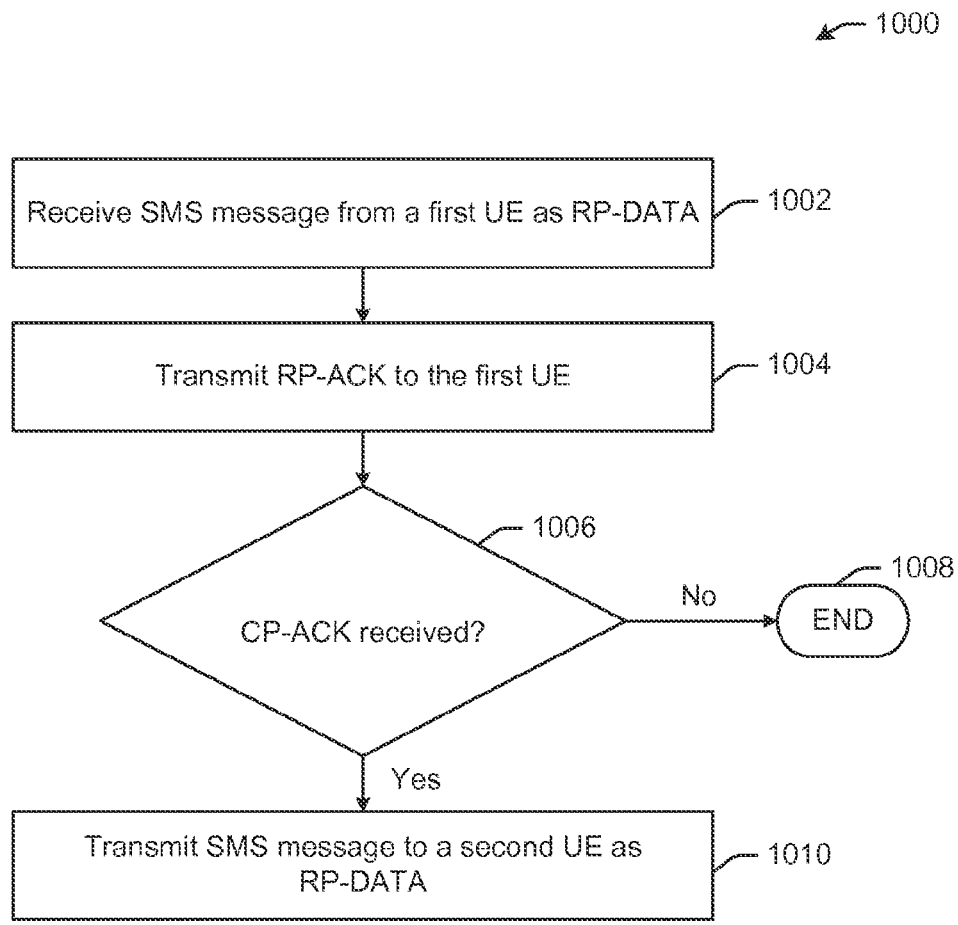
FIG. 10 is another flow diagram illustrating an example method for the MSC to relay an SMS message to a second user equipment, in accordance with example embodiments of the disclosure.

FIG. 10 is another flow diagram illustrating an example method 1000 for the MSC 430 to relay an SMS message to a second user equipment 302, in accordance with example embodiments of the disclosure. The method, in example embodiments, may be performed by the MSC 430 in cooperation one or more other entities, such as the UE 110 and/or the MME 410.

At block 1002, an SMS message may be received from a first UE as RP-DATA. The SMS message may be received via SG connections with a MME 410 corresponding to the first UE. The SMS message 140 may be identified, such as by parsing RP-DATA and/or the one or more data packets receive by the MSC 430 to identify the SMS message 140 payload therein.

At block 1004, an RP-ACK may be transmitted to the first UE. It may be determined if the received SMS message has errors. A variety of potential errors may be checked, such as errors of exceeding the memory capacity of the MSC 430, invalid short message transfer reference value, semantically incorrect message, invalid mandatory information, message type non-existent or not implemented, message not compatible with short message protocol state, information element non-existent or not implemented, or unspecified protocol error. From running these checks, it may be determined if there are any errors present in the receive SMS message. If there are no errors in the received SMS message, then an RP-ACK may be generated and transmitted to the UE 110 via the MME 410 and eNodeB 120. The RP-ACK may include a variety of data fields, such as a message type, a message reference, and user data. In example embodiments, the message type may be 3 bit long, the message reference may be 1 octet, and the user data may be 234 octets or less. In example embodiments, the user data field may be optional in the RP-ACK At block 1006, it may be determined if a CP-ACK has been received. If it is determined, at block 1006, that the CP-ACK has not been received, then at block 1008, the method 1000 may end and, therefore, the SMS message may not be delivered to a recipient UE. In this case, the MSC 430 may receive a duplicate of the SMS message as RP-DATA form the first UE, since the first UE did not acknowledge, with a CP-ACK, the receipt of the RP-ACK. On the other hand, if it is determined, at block 1006, that the CP-ACK corresponding to the transmitted RP-ACK and received RP-DATA is received, then at block 1010, the SMS message may be transmitted to a second UE (e.g., a UE for which the message was intended) as RP-DATA.

It should be noted that the method 1000 may be modified in various ways in accordance with certain embodiments. For example, one or more operations of the method 1000 may be eliminated or executed out of order in other embodiments. Additionally, other operations may be added to the method 1000 in accordance with other embodiments.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A mobile device, comprising:
a transceiver configured to communicate with a base station of a long term evolution (LTE) network;
at least one memory that stores computer-executable instructions;
at least one processor that accesses the at least one memory and operationally coupled to the transceiver, wherein the at least one processor is configured to:
send a first service request to the base station via the transceiver, wherein transmitting the first service request establishes a first non-access stratum (NAS) communications connection with a mobile management entity (MME) of the LTE network;
send, via the transceiver and using the first NAS communications connection, a short message service (SMS) message;
measure an amount of time elapsed from when the SMS message was sent;
determine that the first NAS communications connection has been disconnected prior to receiving a first acknowledgment message from the MME responsive to the SMS message;
identify that the amount of time is less than a threshold amount of elapsed time;
receive a page from the MME indicating that the first acknowledgement message is to be received by the mobile device;
send a second service request to the base station via the transceiver, wherein transmitting the second service request establishes a second NAS communications connection with the MME;
receive the first acknowledgment message indicating receipt of the SMS message, wherein receiving the first acknowledgement message further indicates that the SMS message was received by a mobile communications network device in an error-free state; and
send, via the transceiver and using the second NAS communication connection, a second acknowledgement message to the MME after receiving the first acknowledgment message.

2. The mobile device of claim 1, wherein the at least one processor is configured to receive the first acknowledgment message via the transceiver after determining that the amount of time is less than the threshold amount of elapsed time, wherein the threshold amount of elapsed time is about 35 seconds.

3. The mobile device of claim 1, wherein sending the second service request to the base station further establish a radio resource control (RRC) connection to enable establishing the second NAS communication connection.

4. The mobile device of claim 1, wherein the mobile communications network device comprises a mobile service center (MSC) of the LTE network, and wherein the error-free state indicates that the SMS message lacks: (i) invalid short message transfer reference value, (ii) semantically incorrect message error, (iii) invalid mandatory information error, (iv) message type non-existent or not implemented error, (v) message not compatible with short message protocol state error, (vi) information element non-existent or not implemented, or (vii) unspecified protocol error.

5. A mobile device, comprising:
at least one memory that stores computer-executable instructions;

at least one processor that accesses the at least one memory, wherein the at least one processor is configured to:
send, using a first non-access stratum (NAS) communications connection, a short message service (SMS) message;
determine that the first NAS communications connection has been disconnected;
send a service request for establishing a second NAS communications connection after determining that the first NAS communications connection has been disconnected and receiving a page;
receive a response report associated with the SMS message using the second NAS communications connection, wherein the response report indicates that the SMS message was received by a mobile communications network device in an error-free state; and
send an acknowledgment message using the second NAS communications link.

6. The mobile device of claim 5, wherein sending the service request message comprises sending the service request message to a base station of a mobile communications network to establish a radio resource control (RRC) connection with the base station.

7. The mobile device of claim 5, wherein the at least one processor is further configured to measure an amount of elapsed time from when the SMS message was sent, wherein receiving the response report comprises receiving the response report prior to the amount of elapsed time reaching a threshold amount of elapsed time.

8. The mobile device of claim 5, wherein the at least one processor is configured to send the service request comprises measuring an amount of elapsed time from when the SMS message was sent, wherein the service request is sent prior to the amount of elapsed time reaching a threshold amount of elapsed time.

9. The mobile device of claim 5, wherein the at least one processor is configured to send the SMS message comprises encapsulating the SMS message in a NAS protocol data unit.

10. The mobile device of claim 5, wherein the second NAS communications connection is with a mobile management entity of a mobile communications network.

11. The mobile device of claim 5, wherein the service request is a first service request and wherein the at least one processor is configured to:
send, using a third NAS communications connection, a second SMS message;
measure an amount of elapsed time from when the second SMS message is sent;
identify that the third NAS communications connection has been disconnected;
send a second service request for establishing a fourth NAS communications connection after identifying that the third NAS communications connection has been disconnected;
identify that the amount of elapsed time has reached a threshold amount of elapsed time; and
sending, via the fourth NAS communications connection, a duplicate of the second SMS message.

12. A method, comprising:
sending, by a user device comprising one or more processors, using a first non-access stratum (NAS) communications connection, a short message service (SMS) message;
determining, by the user device, that the first NAS communications connection has been disconnected;
sending, by the user device, a service request for establishing a second NAS communications connection after determining that the first NAS communications connection has been disconnected;
receiving, by the user device, a response report associated with the SMS message from the mobile communications network using the second NAS communications connection, wherein the response report indicates that the SMS message was received by a mobile communications network device in an error-free state; and
sending, by the user device, an acknowledgment message using the second NAS communications connection.

13. The method of claim 12, wherein sending the service request message comprises sending the service request message to a base station of a mobile communications network to establish a radio resource control (RRC) connection with the base station.

14. The method of claim 12, further comprising measuring, by the user device, an amount of elapsed time from when the SMS message was sent, wherein receiving the response report comprises receiving the response report prior to the amount of elapsed time reaching a threshold amount of elapsed time.

15. The method of claim 12, wherein sending the service request comprises measuring an amount of elapsed time from when the SMS message was sent, wherein the service request is sent prior to the amount of elapsed time reaching a threshold amount of elapsed time.

16. The method of claim 12, wherein sending the SMS message comprises encapsulating the SMS message in a NAS protocol data unit.

17. The method of claim 12, wherein second NAS communications connection is with a mobile management entity of a mobile communications network.

18. The method of claim 12, wherein the at least one processor is configured to:
send, using a third NAS communications connection, a second SMS message;
measure an amount of elapsed time from when the second SMS message is sent;
identify that the third NAS communications connection has been disconnected;
send a second service request for establishing a fourth NAS communications connection after identifying that the third NAS communications connection has been disconnected;
identify that the amount of elapsed time has reached a threshold amount of elapsed time; and
sending, via the fourth NAS communications connection, a duplicate of the second SMS message.

* * * * *